US012803685B2

(12) United States Patent
Sahraei et al.

(10) Patent No.: US 12,803,685 B2
(45) Date of Patent: Nov. 17, 2026

(54) INTERFERENCE MITIGATION USING RECONFIGURABLE INTELLIGENT SURFACES

(71) Applicant: QUALCOMM Incorporated, San Diego, CA (US)

(72) Inventors: Saeid Sahraei, San Diego, CA (US); Hung Dinh Ly, San Diego, CA (US); Yu Zhang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/560,029

(22) PCT Filed: Jul. 23, 2021

(86) PCT No.: PCT/CN2021/108049
§ 371 (c)(1),
(2) Date: Nov. 9, 2023

(87) PCT Pub. No.: WO2023/000287
PCT Pub. Date: Jan. 26, 2023

(65) Prior Publication Data
US 2024/0364434 A1 Oct. 31, 2024

(51) Int. Cl.
*H04B 17/309* (2015.01)
*H04B 7/04* (2017.01)

(52) U.S. Cl.
CPC ....... *H04B 17/309* (2015.01); *H04B 7/04013* (2023.05)

(58) Field of Classification Search
None
See application file for complete search history.

(56) References Cited

U.S. PATENT DOCUMENTS 6,998,908 B1 * 2/2006 Sternowski ............ H04B 1/525 327/107
2010/0118706 A1 * 5/2010 Parkvall .................. H04L 5/005 370/241
(Continued)

FOREIGN PATENT DOCUMENTS

CN 102972082 A 3/2013
CN 110476391 A 11/2019
(Continued)

OTHER PUBLICATIONS

English translation of CN 112422162 (Year: 2026).*
(Continued)

*Primary Examiner* — Gennadiy Tsvey
(74) *Attorney, Agent, or Firm* — Harrity & Harrity, LLP

(57) ABSTRACT

Various aspects of the present disclosure generally relate to wireless communication. In some aspects, a user equipment (UE) may perform measurements of a first plurality of interference measurement resources on a channel from a reconfigurable intelligent surface (RIS) to the UE. The first plurality of interference measurement resources are associated with a plurality of beams. Accordingly, the UE may transmit a first report based at least in part on the measurements of the first plurality of interference measurement resources. The UE may additionally perform measurements of a second plurality of interference measurement resources on the channel from the RIS to the UE. The second plurality of interference measurement resources are associated with a plurality of phases. Accordingly, the UE may transmit a second report based at least in part on the measurements of the second plurality of interference measurement resources. Numerous other aspects are described.

30 Claims, 15 Drawing Sheets

(56) References Cited

U.S. PATENT DOCUMENTS

| | | | | |
|---|---|---|---|---|
| 2011/0194639 | A1* | 8/2011 | Nakao | H04W 56/001 375/267 |
| 2013/0058279 | A1* | 3/2013 | Kakishima | H04B 7/0417 370/328 |
| 2015/0031384 | A1* | 1/2015 | Jiang | H04L 5/0032 455/452.1 |
| 2015/0270917 | A1* | 9/2015 | Roman | H04B 7/0417 370/329 |
| 2018/0219664 | A1* | 8/2018 | Guo | H04B 17/318 |
| 2020/0245166 | A1 | 7/2020 | Kwak et al. | |
| 2020/0358501 | A1 | 11/2020 | Hormis et al. | |
| 2021/0156983 | A1* | 5/2021 | Kraut | G01S 7/4008 |
| 2021/0345399 | A1* | 11/2021 | Levy | H04B 17/345 |
| 2022/0231753 | A1* | 7/2022 | Bengtsson | H04B 7/145 |
| 2023/0009770 | A1* | 1/2023 | Li | H04B 7/0621 |
| 2024/0064546 | A1* | 2/2024 | Sun | H04W 24/10 |

FOREIGN PATENT DOCUMENTS

| | | | | | |
|---|---|---|---|---|---|
| CN | 111313951 | A | * | 6/2020 | H04B 7/04013 |
| CN | 112260739 | A | * | 1/2021 | H04B 7/04013 |
| CN | 112367672 | A | * | 2/2021 | H04B 7/04013 |
| CN | 112422162 | A | * | 2/2021 | H04B 7/04013 |
| JP | 2002252584 | A | * | 9/2002 | |
| WO | 2018128940 | A2 | | 7/2018 | |
| WO | WO-2020254031 | A1 | * | 12/2020 | H04B 7/088 |
| WO | 2021056282 | A1 | | 4/2021 | |
| WO | WO-2022199818 | A1 | * | 9/2022 | H04B 7/15528 |

OTHER PUBLICATIONS

Apple Inc: “Consideration on Beam Measurement and Reporting Enhancement”, 3GPP TSG RAN WG1 Meeting #95, R1-1812921, Spokane, USA, Nov. 12-16, 2018, the Whole Document, pp. 1-9.

International Search Report and Written Opinion—PCT/CN2021/108049—ISA/EPO—Apr. 20, 2022.

LG Electronics: “Discussion on Interference Measurement”, 3GPP TSG RAN WG1 NR Ad-Hoc Meeting, R1-1700474, Spokane, USA, Jan. 16-20, 2017, the whole document, 5 Pages.

Ning B., et al., “Channel Estimation and Hybrid Beamforming for Reconfigurable Intelligent Surfaces Assisted THz Communications”, arxiv.org, Cornell University Library, 201 Olin Library Cornell University Ithaca, NY 14853, Dec. 25, 2019, 16 Pages, XP081642341, Section II, p. 2-p. 3, figure 2, 13,14, Section III.C, p. 7-p. 9, figures 10,12.

Pan C., et al., “Multicell MIMO Communications Relying on Intelligent Reflecting Surface”, arxiv.org, Cornell University Library, 201 Olin Library Cornell University Ithaca, NY 14853, Jul. 25, 2019, 30 Pages, XP081488929, p. 2, line 16-line 24, figure 1, p. 5, line 3-line 8.

Supplementary European Search Report—EP21950537—Search Authority—Munich—Mar. 17, 2025.

* cited by examiner

INTERFERENCE MITIGATION USING RECONFIGURABLE INTELLIGENT SURFACES

CROSS-REFERENCE TO RELATED APPLICATION

This application is a 371 national stage application of PCT Application No. PCT/CN2021/108049 filed on Jul. 23, 2021, entitled "INTERFERENCE MITIGATION USING RECONFIGURABLE INTELLIGENT SURFACES," which is hereby expressly incorporated by reference herein.

FIELD OF THE DISCLOSURE

Aspects of the present disclosure generally relate to wireless communication and to techniques and apparatuses for interference mitigation using reconfigurable intelligent surfaces.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors, coupled to the memory, configured to perform measurements of a first plurality of interference measurement resources on a channel from a reconfigurable intelligent surface (RIS) to the UE, wherein the first plurality of interference measurement resources are associated with a plurality of beams; transmit, to a base station, a first report based at least in part on the measurements of the first plurality of interference measurement resources; perform measurements of a second plurality of interference measurement resources on the channel from the RIS to the UE, wherein the second plurality of interference measurement resources are associated with a plurality of phases; and transmit, to the base station, a second report based at least in part on the measurements of the second plurality of interference measurement resources.

Some aspects described herein relate to an apparatus for wireless communication at a base station. The apparatus may include a memory and one or more processors, coupled to the memory, configured to transmit, to a UE, a first measurement configuration associated with a first plurality of interference measurement resources on a channel from an RIS to the UE, wherein the first plurality of interference measurement resources are associated with a plurality of beams; receive, from the UE, a first report based at least in part on measurements of the first plurality of interference measurement resources; transmit, to the UE, a second measurement configuration associated with a second plurality of interference measurement resources on the channel from the RIS to the UE, wherein the second plurality of interference measurement resources are associated with a plurality of phases; and receive, from the UE, a second report based at least in part on measurements of the second plurality of interference measurement resources.

Some aspects described herein relate to an apparatus for wireless communication at an RIS. The apparatus may include a memory and one or more processors, coupled to the memory, configured to reflect an interfering signal from a non-serving cell towards a served UE such that the reflected interfering signal adds destructively with the interfering signal received by the served UE on a direct channel between the non-serving cell and the served UE.

Some aspects described herein relate to a method of wireless communication performed by a UE. The method may include performing measurements of a first plurality of interference measurement resources on a channel from an RIS to the UE, wherein the first plurality of interference measurement resources are associated with a plurality of beams. The method may further include transmitting, to a base station, a first report based at least in part on the measurements of the first plurality of interference measurement resources. The method may include performing measurements of a second plurality of interference measurement resources on the channel from the RIS to the UE, wherein the second plurality of interference measurement resources are associated with a plurality of phases. The method may further include transmitting, to the base station, a second report based at least in part on the measurements of the second plurality of interference measurement resources.

Some aspects described herein relate to a method of wireless communication performed by a base station. The method may include transmitting, to a UE, a first measurement configuration associated with a first plurality of interference measurement resources on a channel from an RIS to the UE, wherein the first plurality of interference measurement resources are associated with a plurality of beams. The method may further include receiving, from the UE, a first report based at least in part on measurements of the first plurality of interference measurement resources. The method may include transmitting, to the UE, a second measurement configuration associated with a second plurality of interference measurement resources on the channel from the RIS to the UE, wherein the second plurality of interference measurement resources are associated with a plurality of phases. The method may further include receiving, from the UE, a second report based at least in part on measurements of the second plurality of interference measurement resources.

Some aspects described herein relate to a method of wireless communication performed by an RIS. The method may include reflecting an interfering signal from a non-serving cell towards a served UE such that the reflected interfering signal adds destructively with the interfering signal received by the served UE on a direct channel between the non-serving cell and the served UE.

Some aspects described herein relate to a non-transitory computer-readable medium that stores a set of instructions for wireless communication by a UE. The set of instructions, when executed by one or more processors of the UE, may cause the UE to perform measurements of a first plurality of interference measurement resources on a channel from an RIS to the UE, wherein the first plurality of interference measurement resources are associated with a plurality of beams, and transmit, to a base station, a first report based at least in part on the measurements of the first plurality of interference measurement resources. The set of instructions, when executed by one or more processors of the UE, may further cause the UE to perform measurements of a second plurality of interference measurement resources on the channel from the RIS to the UE, wherein the second plurality of interference measurement resources are associated with a plurality of phases, and transmit, to the base station, a second report based at least in part on the measurements of the second plurality of interference measurement resources.

Some aspects described herein relate to a non-transitory computer-readable medium that stores a set of instructions for wireless communication by a base station. The set of instructions, when executed by one or more processors of the base station, may cause the base station to transmit, to a UE, a first measurement configuration associated with a first plurality of interference measurement resources on a channel from an RIS to the UE, wherein the first plurality of interference measurement resources are associated with a plurality of beams, and receive, from the UE, a first report based at least in part on measurements of the first plurality of interference measurement resources. The set of instructions, when executed by one or more processors of the base station, may further cause the base station to transmit, to the UE, a second measurement configuration associated with a second plurality of interference measurement resources on the channel from the RIS to the UE, wherein the second plurality of interference measurement resources are associated with a plurality of phases, and receive, from the UE, a second report based at least in part on measurements of the second plurality of interference measurement resources.

Some aspects described herein relate to a non-transitory computer-readable medium that stores a set of instructions for wireless communication by an RIS. The set of instructions, when executed by one or more processors of the RIS, may cause the RIS to reflect an interfering signal from a non-serving cell towards a served UE such that the reflected interfering signal adds destructively with the interfering signal received by the served UE on a direct channel between the non-serving cell and the served UE.

Some aspects described herein relate to an apparatus for wireless communication. The apparatus may include means for performing measurements of a first plurality of interference measurement resources on a channel from an RIS to the apparatus, wherein the first plurality of interference measurement resources are associated with a plurality of beams. The apparatus may further include means for transmitting, to a base station, a first report based at least in part on the measurements of the first plurality of interference measurement resources. The apparatus may include means for performing measurements of a second plurality of interference measurement resources on the channel from the RIS to the apparatus, wherein the second plurality of interference measurement resources are associated with a plurality of phases. The apparatus may further include means for transmitting, to the base station, a second report based at least in part on the measurements of the second plurality of interference measurement resources.

Some aspects described herein relate to an apparatus for wireless communication. The apparatus may include means for transmitting, to a UE, a first measurement configuration associated with a first plurality of interference measurement resources on a channel from an RIS to the UE, wherein the first plurality of interference measurement resources are associated with a plurality of beams. The apparatus may further include means for receiving, from the UE, a first report based at least in part on measurements of the first plurality of interference measurement resources. The apparatus may include means for transmitting, to the UE, a second measurement configuration associated with a second plurality of interference measurement resources on the channel from the RIS to the UE, wherein the second plurality of interference measurement resources are associated with a plurality of phases. The apparatus may further include means for receiving, from the UE, a second report based at least in part on measurements of the second plurality of interference measurement resources.

Some aspects described herein relate to an apparatus for wireless communication. The apparatus may include means for reflecting an interfering signal from a non-serving cell towards a served UE such that the reflected interfering signal adds destructively with the interfering signal received by the served UE on a direct channel between the non-serving cell and the served UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
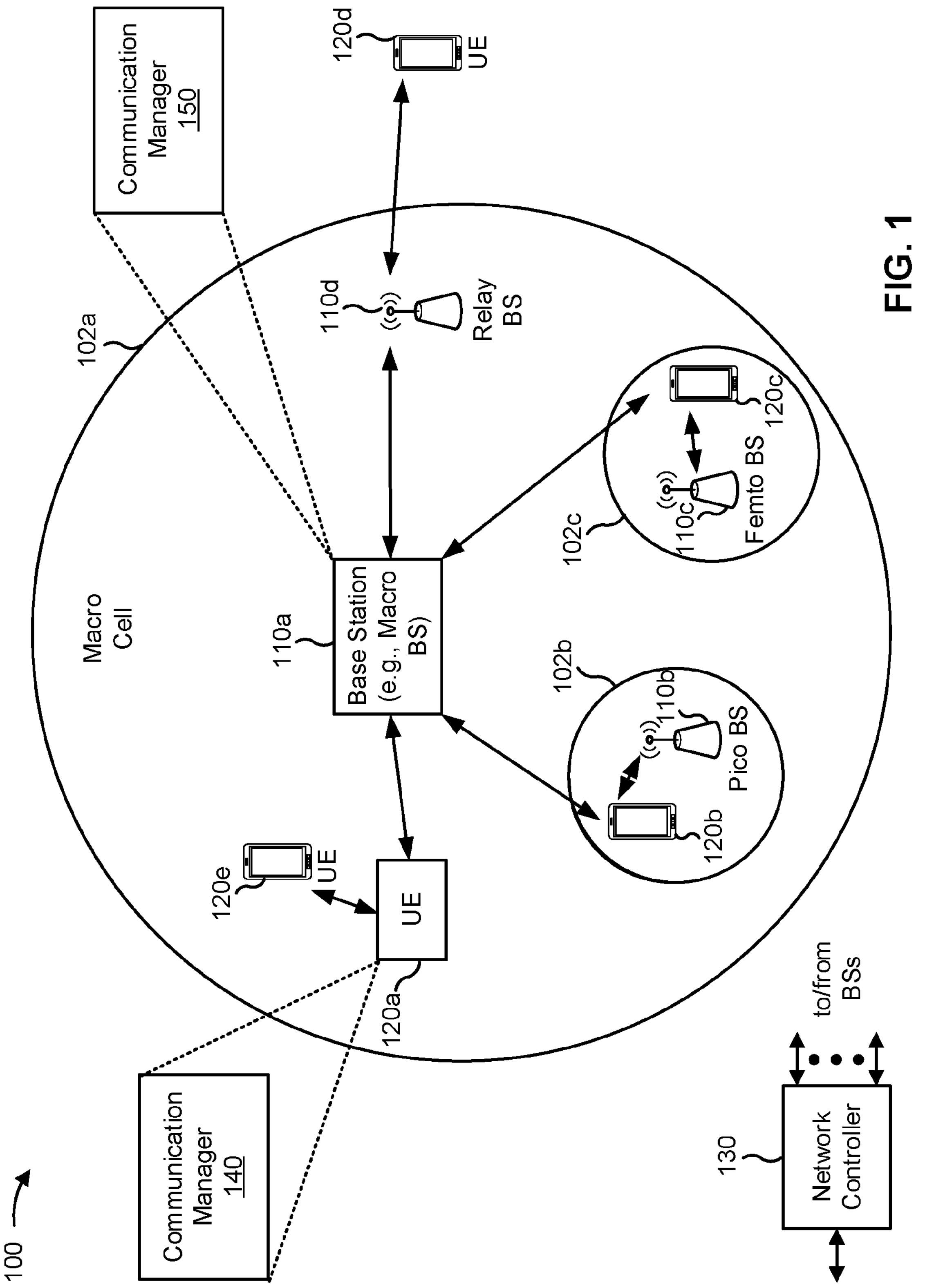
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity Some UEs 120 may be considered Internet-of-Things (IoT) devices, and/or may be implemented as NB-IoT (narrowband IoT) devices. Some UEs 120 may be considered a Customer Premises Equipment A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHZ-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHz), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform measurements of a first plurality of interference measurement resources on a channel from a reconfigurable intelligent surface (RIS) to the UE 120, wherein the first plurality of interference measurement resources are associated with a plurality of beams; transmit, to a base station (e.g., the base station 110), a first report based at least in part on the measurements of the first plurality of interference measurement resources; perform measurements of a second plurality of interference measurement resources on the channel from the RIS to the UE, wherein the second plurality of interference measurement resources are associated with a plurality of phases; and transmit, to the base station, a second report based at least in part on the measurements of the second plurality of interference measurement resources. Additionally, or alternatively, the communication manager 140 may perform one or more other operations described herein.

In some aspects, the base station 110 may include a communication manager 150. As described in more detail elsewhere herein, the communication manager 150 may transmit, to a UE (e.g., the UE 120), a first measurement configuration associated with a first plurality of interference measurement resources on a channel from an RIS to the UE, wherein the first plurality of interference measurement resources are associated with a plurality of beams; receive, from the UE, a first report based at least in part on measurements of the first plurality of interference measurement resources; transmit, to the UE, a second measurement configuration associated with a second plurality of interference measurement resources on the channel from the RIS to the UE, wherein the second plurality of interference measurement resources are associated with a plurality of phases; and receive, from the UE, a second report based at least in part on measurements of the second plurality of interference measurement resources. Additionally, or alternatively, the communication manager 150 may perform one or more other operations described herein.

As indicated above, FIG. 1 is provided as an example. Other examples may differ from what is described with regard to FIG. 1.

Figure 2:
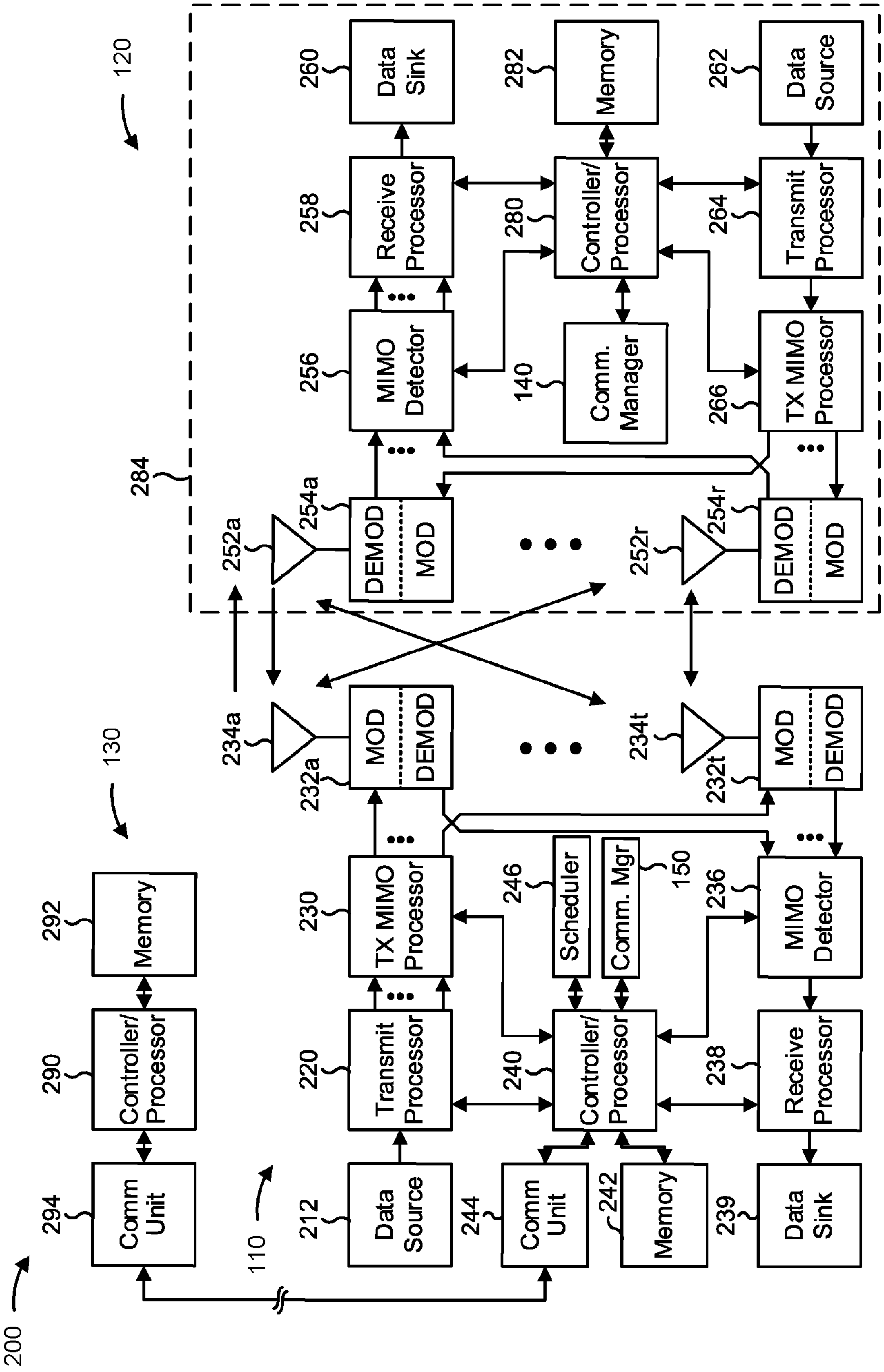
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-13).

The controller/processor 240 of the base station 110, the controller/processor 280 of the UE 120, and/or any other component(s) of FIG. 2 may perform one or more techniques associated with interference mitigation using RISs, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., the UE 120) may include means for performing measurements of a first plurality of interference measurement resources on a channel from an RIS (e.g., RIS 405, as described herein) to the UE, wherein the first plurality of interference measurement resources are associated with a plurality of beams; means for transmitting, to a base station (e.g., the base station 110), a first report based at least in part on the measurements of the first plurality of interference measurement resources; means for performing measurements of a second plurality of interference measurement resources on the channel from the RIS to the UE, wherein the second plurality of interference measurement resources are associated with a plurality of phases; and/or means for transmitting, to the base station, a second report based at least in part on the measurements of the second plurality of interference measurement resources. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., the base station 110) may include means for transmitting, to a UE (e.g., the UE 120), a first measurement configuration associated with a first plurality of interference measurement resources on a channel from an RIS (e.g., RIS 405) to the UE, wherein the first plurality of interference measurement resources are associated with a plurality of beams; means for receiving, from the UE, a first report based at least in part on measurements of the first plurality of interference measurement resources; means for transmitting, to the UE, a second measurement configuration associated with a second plurality of interference measurement resources on the channel from the RIS to the UE, wherein the second plurality of interference measurement resources are associated with a plurality of phases; and/or means for receiving, from the UE, a second report based at least in part on measurements of the second plurality of interference measurement resources. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an RIS (e.g., RIS 405) may include means for reflecting an interfering signal from a non-serving cell towards a served UE such that the reflected interfering signal adds destructively with the interfering signal received by the served UE on a direct channel between the non-serving cell and the served UE. In some aspects, the means for the RIS to perform operations described herein may include, for example, one or more of communication manager 160 (e.g., as described in connection with FIG. 4), transmit processor 220, TX MIMO processor 230, modem 232, antenna 234, MIMO detector 236, receive processor 238, controller/processor 240, memory 242, or scheduler 246. Additionally, or alternatively, the means for the RIS to perform operations described herein may include, for example, one or more of communication manager 160, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
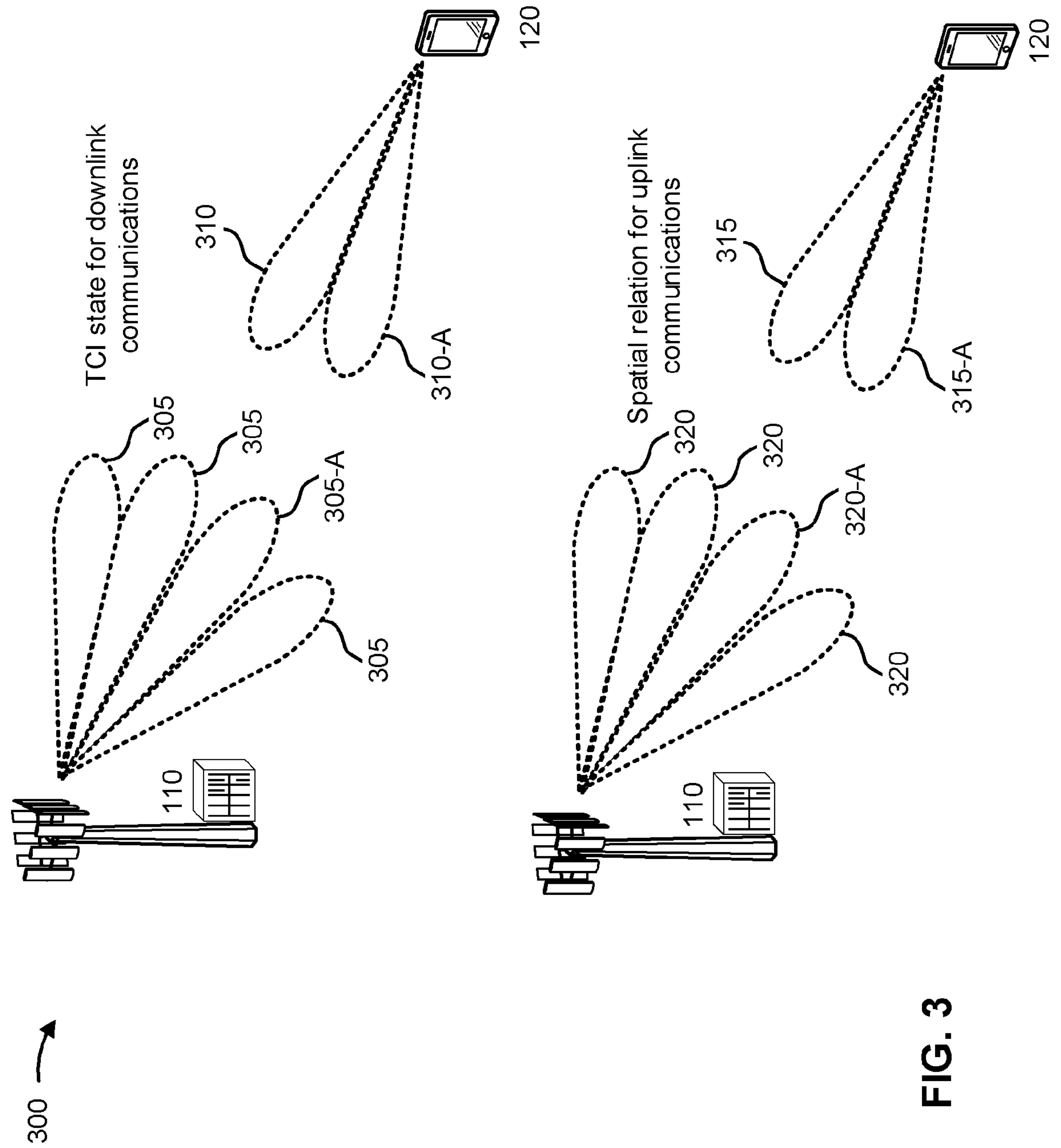
FIG. 3 is a diagram illustrating an example of using beams for communications between a base station and a UE, in accordance with the present disclosure.

FIG. 3 is a diagram illustrating an example 300 of using beams for communications between a base station and a UE, in accordance with the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a transmission configuration indication (TCI) state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

As indicated above, FIG. 3 is provided as an example. Other examples may differ from what is described with respect to FIG. 3.

Figure 4:
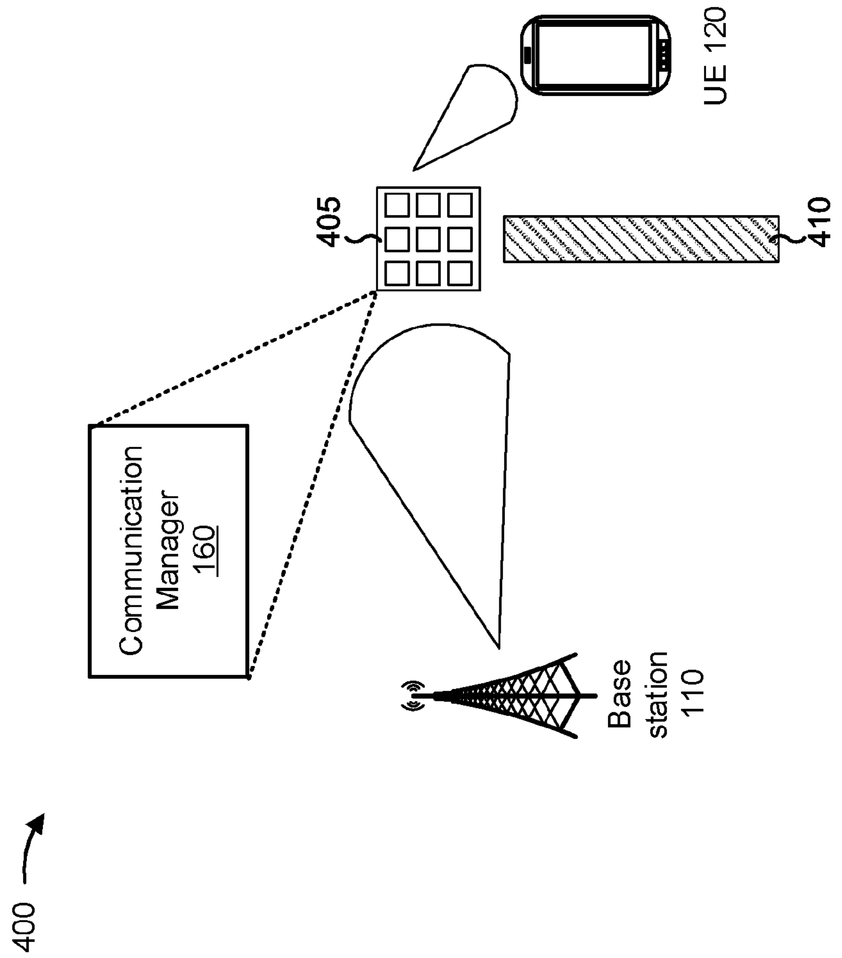
FIG. 4 is a diagram illustrating an example of a reconfigurable intelligent surface (RIS), in accordance with the present disclosure.

FIG. 4 is a diagram illustrating an example 400 of an RIS, in accordance with the present disclosure. RIS 405, which may also be referred to as an intelligent reflecting surface (IRS) or a large intelligent surface (LIS), includes configurable electromagnetic materials to reflect and/or refract electromagnetic signals. RIS 405 may be passive (e.g., including stationary mirrors) or near-passive (e.g., include micro-electro-mechanical systems (MEMS) mirrors and/or other configurable components to reflect and/or refract signals). For example, RIS 405 may be a waveguide-fed metasurface, a refracting and reflecting metasurface, a digital coding reflective metasurface, and/or another metasurface that reflects and/or refracts signals. Accordingly, as shown in FIG. 4, the RIS 405 may propagate a signal from a base station 110 to a UE 120. Additionally, or alternatively, the RIS 405 may propagate a signal from the UE 120 to the base station 110. For example, the RIS 405 may propagate the signal around a barrier 410, such as a building or other man-made structure, a forest or other natural entity, a crowd or other carbon-based blockage, and/or another object that disrupts propagation of the signal.

Some RISs may include a plurality of antenna elements (e.g., different mirrors or other reflective elements or different beamforming reflecting components). As used herein, an "antenna element" may refer to a single reflective and/or refractive component in combination with associated electronics for that element or may refer to a physical, virtual, and/or logical grouping of a plurality of reflective and/or refractive components in combination with associated electronics. Accordingly, one of the base station 110 or the UE 120 may concentrate power of a signal, intended for the other of the base station 110 or the UE 120, toward one or more antenna elements of an RIS. For example, the base station 110 may have previously determined a quantity of antenna elements that the RIS has (e.g., the RIS may be connected to the base station 110 through a wired and/or wireless backhaul), and the base station 110 may have previously determined (e.g., using one or more measurements, such as RSRPs RSRQs, and/or other L1 measurements, and/or one or more derived measurements, such as CQIs, precoder matrix indicators (PMIs), rank indicators (RIs), and/or other measurements derived from L1 measurements) TCI states (and thus one or more corresponding beams, as described above in connection with FIG. 3) that concentrate power of a signal from the base station 110 toward corresponding antenna elements of the RIS. Accordingly, the base station 110 may select a TCI state to target one or more corresponding antenna elements. Similarly, the base station 110 may have previously indicated to the UE 120 a quantity of antenna elements that the RIS has (e.g., via an RRC message, downlink control information (DCI), and/or another message), and the base station 110 may have indicated to the UE 120 (e.g., via an RRC message, DCI, and/or another message) TCI states (and thus one or more corresponding beams, as described above in connection with FIG. 3) that concentrate power of a signal from the UE 120 toward corresponding antenna elements of the RIS. Accordingly, the UE 120 may select a TCI state to target one or more corresponding antenna elements.

In some aspects, the RIS 405 may include a communication manager 160. As described in more detail elsewhere herein, the communication manager 160 may reflect an interfering signal from a non-serving cell towards a served UE (e.g., the UE 120) such that the reflected interfering signal adds destructively with the interfering signal received by the served UE on a direct channel between the non-serving cell and the served UE. Additionally, or alternatively, the communication manager 160 may perform one or more other operations described herein.

As indicated above, FIG. 4 is provided as an example. Other examples may differ from what is described with respect to FIG. 4.

In some situations, a UE may receive signals from a base station within a serving cell. However, the UE may also receive interference from a base station within a neighbor cell. When an RIS is also active within the serving cell, the RIS may reflect interference from the base station within the neighbor cell towards the UE. Accordingly, the UE experiences increased interference. As a result, the UE may consume additional power and processing resources to filter and decode the signals from the base station. Additionally, the UE is more likely to fail to receive and/or successfully decode the signals such that the base station engages in more re-transmissions due to the increased interference. As a result of the additional re-transmissions, the base station and the UE consume additional power and processing resources as well as contribute to network overhead and congestion within the serving cell.

Some techniques and apparatuses described herein enable an RIS (e.g., RIS 405 and/or apparatus 1300 of FIG. 13) to reflect an interfering signal from a non-serving cell towards a UE (e.g., UE 120 and/or apparatus 1100 of FIG. 11) such that the reflected interfering signal adds destructively with the interfering signal received by the UE 120 on a direct channel between the non-serving cell and the UE 120. As a result, the UE 120 experiences decreased interference such that the UE 120 conserves power and processing resources when filtering and decoding signals from a base station within the serving cell (e.g. base station 110*a* and/or apparatus 1200 of FIG. 12). Additionally, the UE 120 is more likely to receive and successfully decode the signals such that the base station 110*a* engages in fewer re-transmissions due to the decreased interference. As a result of the fewer re-transmissions, the base station 110*a* and the UE 120 conserve additional power and processing resources as well as reduce network overhead and congestion within the serving cell.

In some aspects, the base station 110*a* may configure the UE 120 to measure a plurality of interference measurement resources associated with a plurality of beams formed by the RIS 405. Additionally, the base station 110*a* may configure the UE 120 to measure a plurality of interference measurement resources associated with a plurality of phases used by the RIS 405. Accordingly, the base station 110*a* may use measurements from the UE 120 to configure the RIS 405 to reflect the interfering signal from the non-serving cell towards the UE 120 such that the reflected interfering signal adds destructively with the interfering signal received by the UE 120 on a direct channel between the non-serving cell and the UE 120.

Figure 5:
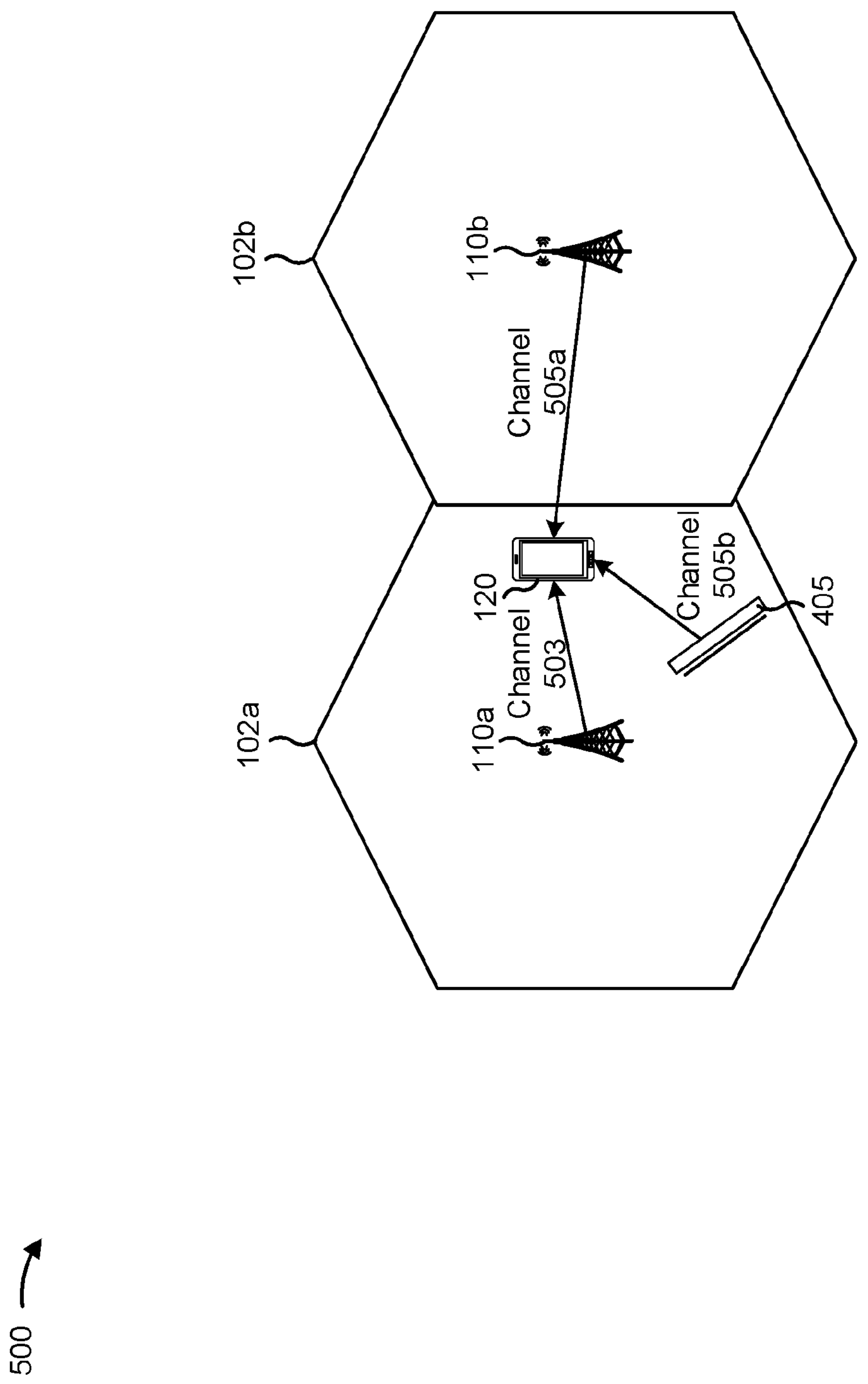
FIG. 5 is a diagram illustrating an example associated with mitigating interference using an RIS, in accordance with the present disclosure.

FIG. 5 is a diagram illustrating an example 500 associated with mitigating interference using an RIS, in accordance with the present disclosure. As shown in FIG. 5, example 500 includes a UE 120 within a serving cell 102*a*. The serving cell 102*a* may include one or more base stations, such as base station 110*a*. The serving cell 102*a* may be adjacent to, or at least within a distance threshold of, one or more neighbor cells, such as neighbor cell 102*b*. Each neighbor cell may include one or more base stations, such as base station 110*b*. Although described using one serving cell and one neighbor cell, the description similarly applies to additional serving cells (e.g., two serving cells, three serving cells, and so on, such as a plurality of serving cells communicating with the UE 120 in a MIMO mode) and/or additional neighbor cells (e.g., two neighbor cells, three neighbor cells, and so on). Additionally, or alternatively, although described using one base station in the serving cell and one base station in the neighbor cell, the description similarly applies to additional base stations in the serving cell (e.g., two base stations, three base stations, and so on) and/or additional base stations in the neighbor cell (e.g., two base stations, three base stations, and so on). In some aspects, the UE 120, the base station 110*a*, and the base station 110*b* may be included in a wireless network, such as wireless network 100.

As shown in FIG. 5, the base station 110*a* may communicate with the UE 120 using a channel 503. However, signals from the base station 110*b* may cause interference, with communications to and from the base station 110*a*, on a channel 505*a*.

As further shown in FIG. 5, the serving cell may include at least one RIS (e.g., RIS 405). Accordingly, the base station 110*a* may transmit, and the RIS 405 may receive, a configuration associated with the channel 505*a*. For example, the configuration may indicate one or more beams, one or more phases, and/or one or more other beamforming parameters, for the RIS 405 to use on a channel 505*b* from the RIS 405 to the UE 120. In some aspects, the base station 110*a* may determine the configuration as described below in connection with FIGS. 6, 7A, and/or 7B.

The configuration may be designed such that reflections of interfering signals from the base station 110*b* transmitted over the channel 505*b* from the RIS 405 to the UE 120 add destructively with the interfering signals from the base station 110*b* transmitted over the channel 505*a*. Therefore, interference at the UE 120 is reduced. Accordingly, the base station 110*a* may transmit, and the UE 120 may receive, a signal on the channel 503 while interference with the signal from the neighbor cell 102*b* is reduced based at least in part on the configuration that the base station 110*a* transmitted to the RIS 405. For example, the UE 120 may receive, from the neighbor cell 102*b*, interference on the channel 505*a* that is at least partially combined, destructively, with interference on the channel 505*b*.

By using techniques described in connection with FIG. 5, the RIS 405 reflects an interfering signal from a non-serving cell (e.g., the neighbor cell 102*b*) towards the UE 120 such that the reflected interfering signal adds destructively with the interfering signal received by the UE 120 on the channel 505*a*. As a result, the UE 120 experiences decreased interference such that the UE 120 conserves power and processing resources when filtering and decoding signals from the base station 110*a*. Additionally, the UE 120 is more likely to receive and successfully decode the signals such that the base station 110*a* engages in fewer re-transmissions due to the decreased interference. As a result of the fewer re-transmissions, the base station 110*a* and the UE 120 conserve additional power and processing resources as well as reduce network overhead and congestion within the serving cell 102*a*.

As indicated above, FIG. 5 is provided as an example. Other examples may differ from what is described with respect to FIG. 5.

Figure 6:
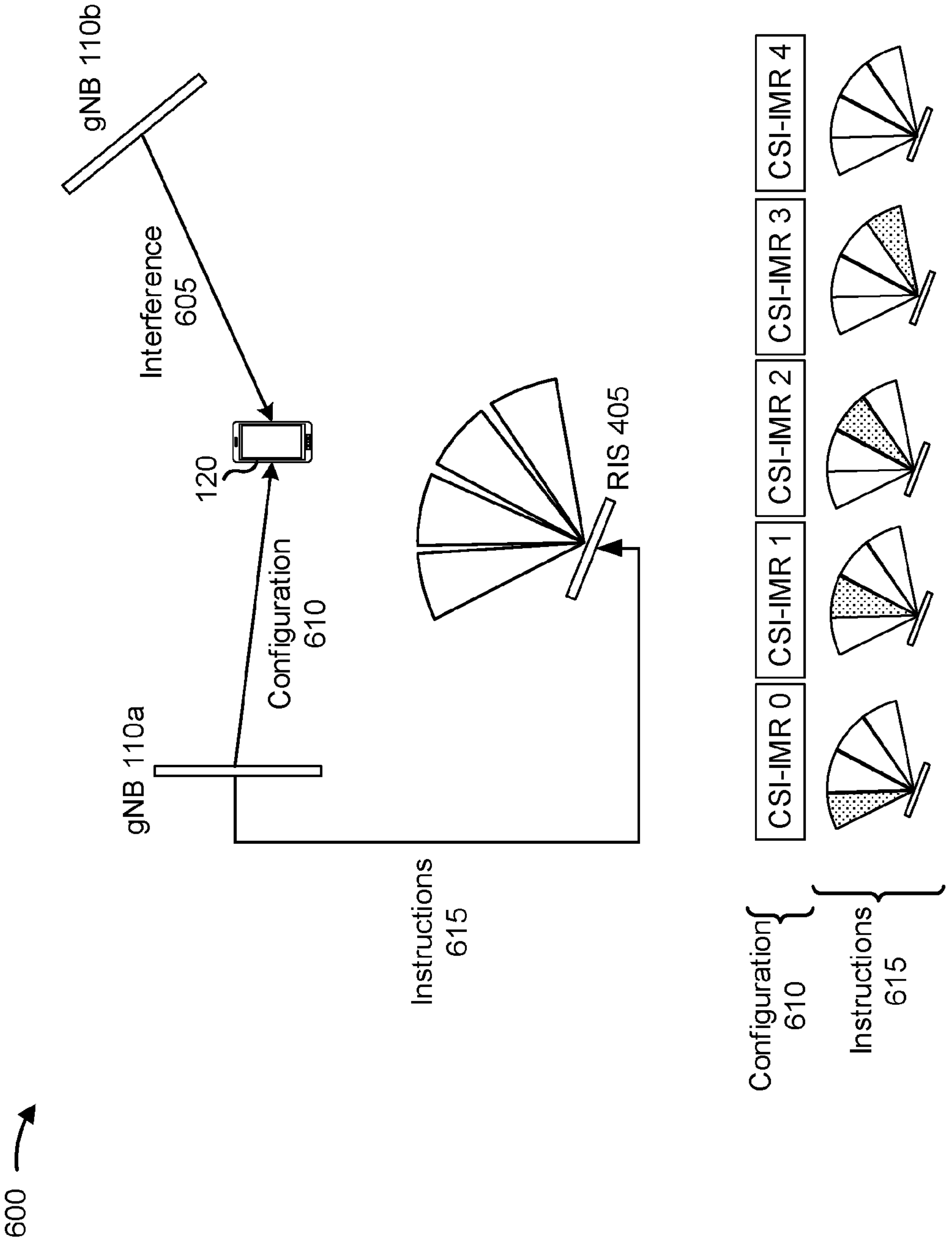
FIG. 6 is a diagram illustrating an example associated with beam sweeping to configure an RIS for interference mitigation, in accordance with the present disclosure.

FIG. 6 is a diagram illustrating an example 600 associated with beam sweeping to configure an RIS for interference mitigation, in accordance with the present disclosure. As shown in FIG. 6, example 600 includes a UE 120 (e.g., within a serving cell). The serving cell may include one or more gNBs, such as gNB 110*a*. The serving cell may be adjacent to, or at least within a distance threshold of, one or more non-serving cells. Each non-serving cell may include one or more gNBs, such as gNB 110*b*. Although described using one serving cell and one non-serving cell, the description similarly applies to additional serving cells (e.g., two serving cells, three serving cells, and so on, such as a plurality of serving cells communicating with the UE 120 in a MIMO mode) and/or additional non-serving cells (e.g., two non-serving cells, three non-serving cells, and so on). Additionally, or alternatively, although described using one gNB in the serving cell and one gNB in the non-serving cell, the description similarly applies to additional gNBs in the serving cell (e.g., two gNBs, three gNBs, and so on) and/or additional gNBs in the non-serving cell (e.g., two gNBs, three gNBs, and so on). In some aspects, the UE 120, the gNB 110*a*, and the gNB 110*b* may be included in a wireless network, such as wireless network 100.

The UE 120 may receive interference 605 from the gNB 110*b* of the non-serving cell. Accordingly, the gNB 110*a* may use an RIS included in the serving cell (e.g., RIS 405) to mitigate the interference 605.

As shown in FIG. 6, the gNB 110*a* may transmit, and the UE 120 may receive, a first measurement configuration 610 associated with a first plurality of interference measurement resources on a channel from the RIS 405 to the UE 120. For example, the gNB 110*a* may transmit the first measurement configuration 610 using an RRC message, a medium access control (MAC) layer control element (MAC-CE), DCI, and/or another type of message. In some aspects, and as shown in FIG. 6, the first measurement configuration 610 may include a plurality of channel state information interference measurement resources (CSI-IMRs).

Additionally, the gNB 110*a* may transmit, and the RIS 405 may receive, one or more instructions 615 associated with the first measurement configuration 610. For example, the gNB 110*a* may communicate with the RIS 405 on a wired backhaul link and/or a wireless backhaul link. In some aspects, as shown in FIG. 6, the instruction(s) 615 may configure the RIS 405 to sweep a plurality of beams.

Accordingly, the first plurality of interference measurement resources may be associated with the plurality of beams. For example, as shown in FIG. 6, each CSI-IMR, of the plurality of CSI-IMRs, may be associated with a corresponding beam, of the plurality of beams. In some aspects, at least one of the first plurality of interference measurement resources may include at least one resource associated with a scatterer configuration of the RIS 405. Accordingly, as shown in FIG. 6, one CSI-IMR is associated with the scatterer configuration of the RIS 405. The scatterer configuration may refer to a mode of operation in which the RIS 405 does not perform amplification, beamforming, and/or another active operation on a received signal (such as the interference 605) when reflecting the received signal.

Accordingly, the UE 120 may perform measurements of the first plurality of interference measurement resources on a channel from the RIS 405 to the UE 120. For example, the UE 120 may perform zero-power measurements of interference according to the first measurement configuration 610. The RIS 405 may also perform beam sweeping across the plurality of beams. For example, the RIS 405 may adjust one or more elements included on the RIS 405 according to the instruction(s) 615.

The UE 120 may transmit, and the gNB 110*a* may receive, a first report based at least in part on the measurements of the first plurality of interference measurement resources. For example, the first report may include a CSI report. In some aspects, the first report may indicate a resource, of the first plurality of interference measurement resources, associated with a highest measurement of the measurements of the first plurality of interference resources. For example, the indicated resource may be indicative that the beam associated with the indicated resource is a candidate for being used to reduce interference 605. Accordingly, the gNB 110*a* may use the beam associated with the indicated resource for phase sweeping (e.g., as described in connection with FIG. 7A or FIG. 7B).

Additionally, in some aspects, the first report may indicate a difference between a highest measurement, of the measurements of the first plurality of interference resources, and a lowest measurement, of the measurements of the first plurality of interference resources. Generally, the lowest measurement may be associated with the scatterer configuration of the RIS 405, as described above. Accordingly, the gNB 110*a* may transmit, and the RIS 405 may receive, one or more instructions based at least in part on the difference indicated by the first report. For example, the gNB 110*a* may deem the RIS 405 based at least in part on the indicated difference. Deeming the RIS 405 may refer to an adjustment of beam width, reflection efficiency, and/or another parameter associated with reflectivity of the RIS 405 such that an amplitude of reflections from the RIS 405 is approximately equal to (e.g., within 5% of) an amplitude of interference 605. Accordingly, the gNB 110*a* may proceed to phase sweeping (e.g., as described in connection with FIG. 7A or FIG. 7B) after deeming the RIS 405.

As indicated above, FIG. 6 is provided as an example. Other examples may differ from what is described with respect to FIG. 6.

Figure 7A:
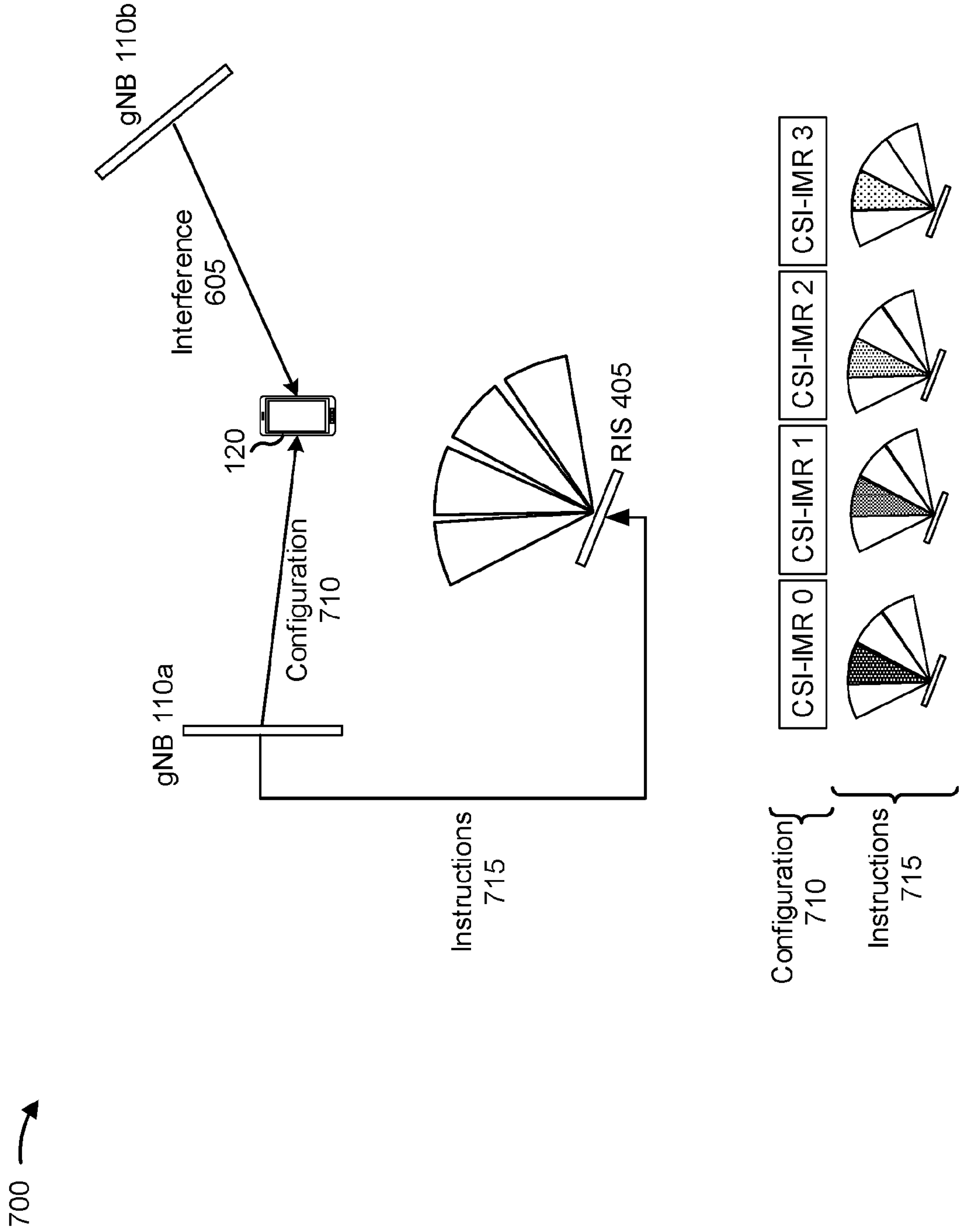
FIGS. 7A and 7B are diagrams illustrating examples associated with phase sweeping to configure an RIS for interference mitigation, in accordance with the present disclosure.

FIG. 7A is a diagram illustrating an example 700 associated with phase sweeping to configure an RIS for interference mitigation, in accordance with the present disclosure. Similar to example 600, example 700 includes a UE 120 within a serving cell that includes one or more gNBs, such as gNB 110*a*. The serving cell may be adjacent to, or at least within a distance threshold of, one or more non-serving cells that each include one or more gNBs, such as gNB 110*b*. Although described using one serving cell and one non-serving cell, the description similarly applies to additional serving cells (e.g., two serving cells, three serving cells, and so on, such as a plurality of serving cells communicating with the UE 120 in a MIMO mode) and/or additional non-serving cells (e.g., two non-serving cells, three non-serving cells, and so on). Additionally, or alternatively, although described using one gNB in the serving cell and one gNB in the non-serving cell, the description similarly applies to additional gNBs in the serving cell (e.g., two gNBs, three gNBs, and so on) and/or additional gNBs in the non-serving cell (e.g., two gNBs, three gNBs, and so on). In some aspects, the UE 120, the gNB 110*a*, and the gNB 110*b* may be included in a wireless network, such as wireless network 100.

The UE 120 may receive interference 605 from the gNB 110*b* of the non-serving cell. Accordingly, the gNB 110*a* may use an RIS included in the serving cell (e.g., RIS 405) to mitigate the interference 605.

As shown in FIG. 7A, the gNB 110*a* may transmit, and the UE 120 may receive, a second measurement configuration 710 associated with a second plurality of interference measurement resources on a channel from the RIS 405 to the UE 120. For example, the gNB 110*a* may transmit the second measurement configuration 710 using an RRC message, a MAC-CE, DCI, and/or another type of message. In some aspects, and as shown in FIG. 7A, the second measurement configuration 710 may include a plurality of CSI-IMRs. The second plurality of interference resources may be associated with a beam, of a plurality of beams, that is associated with a resource indicated by a first report from the UE 120 (e.g., as described in connection with FIG. 6).

Additionally, the gNB 110*a* may transmit, and the RIS 405 may receive, one or more instructions 715 associated with the second measurement configuration 710. For example, the gNB 110*a* may communicate with the RIS 405 on a wired backhaul link and/or a wireless backhaul link. In some aspects, as shown in FIG. 7A, the instruction(s) 715 may configure the RIS 405 to sweep a plurality of phases.

Accordingly, the second plurality of interference measurement resources may be associated with the plurality of phases. For example, as shown in FIG. 7A, each CSI-IMR, of the plurality of CSI-IMRs, may be associated with a corresponding phase, of the plurality of phases.

Accordingly, the UE 120 may perform measurements of the second plurality of interference measurement resources on a channel from the RIS 405 to the UE 120. For example, the UE 120 may perform zero-power measurements of interference according to the second measurement configuration 710. The RIS 405 may also perform phase sweeping across the plurality of phases. For example, the RIS 405 may adjust one or more elements included on the RIS 405 according to the instruction(s) 715.

The UE 120 may transmit, and the gNB 110*a* may receive, a second report based at least in part on the measurements of the second plurality of interference measurement resources. For example, the second report may include a CSI report. In some aspects, the second report may indicate a resource, of the second plurality of interference measurement resources, associated with a lowest measurement of the measurements of the second plurality of interference measurement resources. The indicated resource may be indicative that the phase associated with the indicated resource is a candidate for being used to reduce interference 605. Accordingly, the gNB 110*a* may use the phase associated with the indicated resource for reducing the interference 605 (e.g., as described in connection with FIG. 8A).

By using techniques described in connection with FIGS. 6 and 7A, the base station 110*a* may configure the RIS 405 to reflect an interfering signal from the non-serving cell towards the UE 120 such that the reflected interfering signal adds destructively with the interference 605 received by the UE 120. As a result, the UE 120 experiences decreased interference such that the UE 120 conserves power and processing resources when filtering and decoding signals from the base station 110*a*. Additionally, the UE 120 is more likely to receive and successfully decode the signals such that the base station 110*a* engages in fewer re-transmissions due to the decreased interference. As a result of the fewer re-transmissions, the base station 110*a* and the UE 120 conserve additional power and processing resources as well as reduce network overhead and congestion within the serving cell 102*a*.

As indicated above, FIG. 7A is provided as an example. Other examples may differ from what is described with respect to FIG. 7A.

Figure 7B:
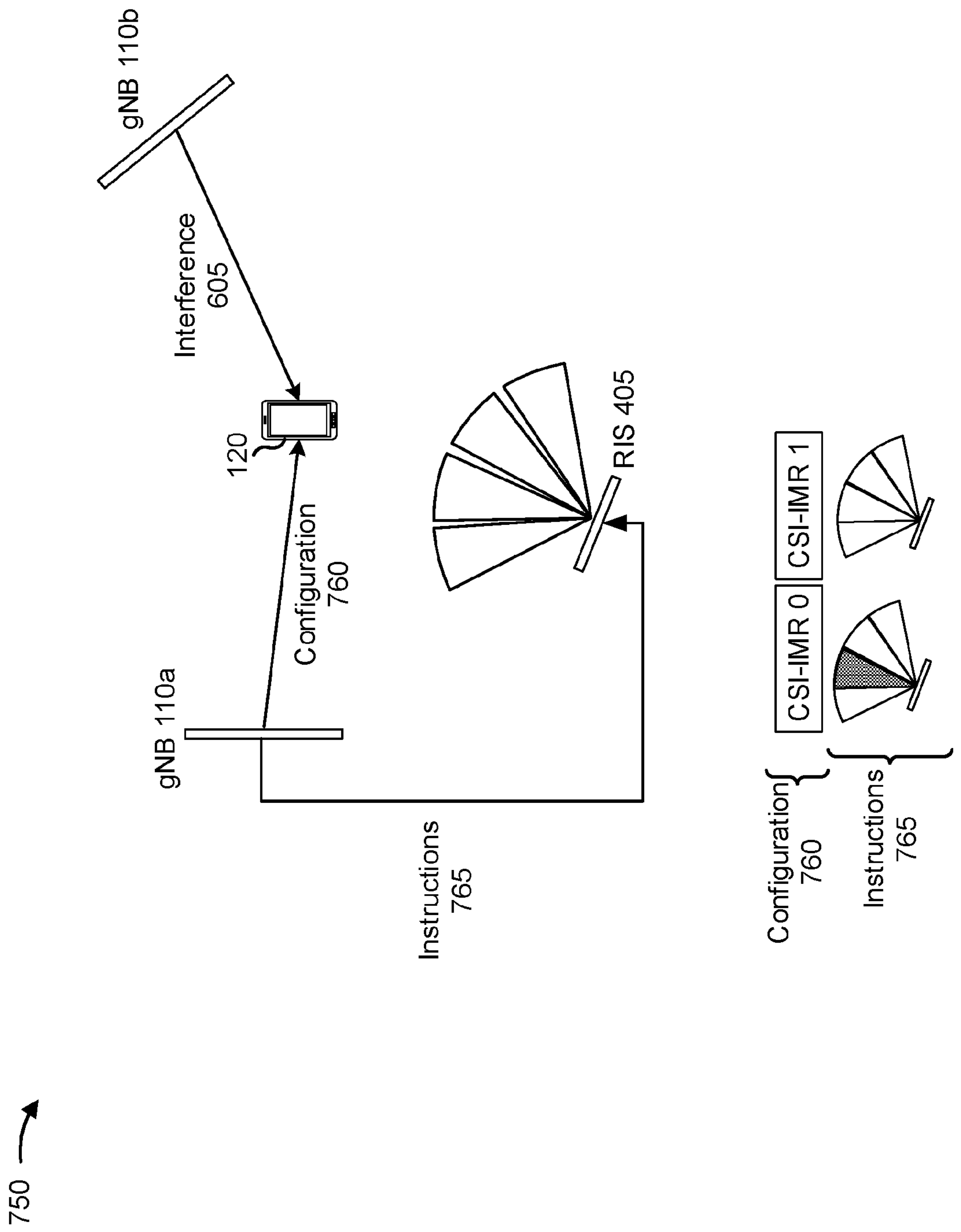

FIG. 7B is a diagram illustrating an example 750 associated with phase sweeping to configure an RIS for interference mitigation, in accordance with the present disclosure. Similar to example 600, example 750 includes a UE 120 within a serving cell that includes one or more gNBs, such as gNB 110*a*. The serving cell may be adjacent to, or at least within a distance threshold of, one or more non-serving cells that each include one or more gNBs, such as gNB 110*b*. Although described using one serving cell and one non-serving cell, the description similarly applies to additional serving cells (e.g., two serving cells, three serving cells, and so on, such as a plurality of serving cells communicating with the UE 120 in a MIMO mode) and/or additional non-serving cells (e.g., two non-serving cells, three non-serving cells, and so on). Additionally, or alternatively, although described using one gNB in the serving cell and one gNB in the non-serving cell, the description similarly applies to additional gNBs in the serving cell (e.g., two gNBs, three gNBs, and so on) and/or additional gNBs in the non-serving cell (e.g., two gNBs, three gNBs, and so on). In some aspects, the UE 120, the gNB 110*a*, and the gNB 110*b* may be included in a wireless network, such as wireless network 100.

The UE 120 may receive interference 605 from the gNB 110*b* of the non-serving cell. Accordingly, the gNB 110*a* may use an RIS included in the serving cell (e.g., RIS 405) to mitigate the interference 605.

As shown in FIG. 7B, the gNB 110*a* may transmit, and the UE 120 may receive, a second measurement configuration 760 associated with a second plurality of interference measurement resources on a channel from the RIS 405 to the UE 120. For example, the gNB 110*a* may transmit the second measurement configuration 760 using an RRC message, a MAC-CE, DCI, and/or another type of message. In some aspects, and as shown in FIG. 7B, the second measurement configuration 760 may include a plurality of CSI-IMRs. The second plurality of interference resources may be associated with a beam, of a plurality of beams, that is associated with a resource indicated by a first report from the UE 120 (e.g., as described in connection with FIG. 6).

Additionally, the gNB 110*a* may transmit, and the RIS 405 may receive, one or more instructions 765 associated with the second measurement configuration 760. For example, the gNB 110*a* may communicate with the RIS 405 on a wired backhaul link and/or a wireless backhaul link. In some aspects, as shown in FIG. 7B, the instruction(s) 765 may configure the RIS 405 to sweep a plurality of phases. In some aspects, at least one of the second plurality of interference measurement resources may include at least one resource associated with a scatterer configuration of the RIS 405. Accordingly, as shown in FIG. 7B, one CSI-IMR is associated with the scatterer configuration of the RIS 405.

Accordingly, the UE 120 may perform measurements of the second plurality of interference measurement resources on a channel from the RIS 405 to the UE 120. For example, the UE 120 may perform zero-power measurements of interference according to the second measurement configuration 760. The RIS 405 may also perform phase sweeping across the plurality of phases. For example, the RIS 405 may adjust one or more elements included on the RIS 405 according to the instruction(s) 765.

In example 750, the gNB 110*a* may receive an indication of a resource signal configuration associated with the non-serving cell from the gNB 110*b*. For example, the gNB 110*a* and the gNB 110*b* may coordinate on a backhaul link (whether wired, wireless, or a combination thereof), such as a Xn interface and/or F1-AP interface. Accordingly, the gNB 110*a* may transmit, and the UE 120 may receive, an indication of the resource signal configuration associated with the non-serving cell.

The UE 120 may therefore estimate a first channel, from the non-serving cell to the UE 120, and a second channel, from the RIS 405 to the UE 120, based at least in part on the measurements of the second plurality of interference resources. For example, the estimated first channel may be represented as $H_1$ and the estimated second channel may be represented as $H_2$.

Accordingly, the second report is based at least in part on the estimated first channel and the estimated second channel. In one example, the UE 120 may include on antenna such that the second report indicates a phase difference between $H_1$ and $-H_2$. Accordingly, the gNB 110*a* may use the phase difference for reducing the interference 605 (e.g., as described in connection with FIG. 8A).

In another example, the UE 120 may include a plurality of antennas. Accordingly, the UE 120 may generate the second report based at least in part on an expression similar to the form:

$$\gamma_{opt} = \text{argmin}_{\gamma}\left\|H^{\dagger}(H_1 + \gamma H_2)\right\|,$$

where $\gamma_{opt}$ may represent a complex phase difference for reducing the interference 605, and $H^{\dagger}$ may represent a combiner matrix based at least in part on a channel between the serving cell and the UE 120. Accordingly, the UE 120 may solve for the complex phase difference. In one example, when the UE 120 includes four antennas, the rank 1 complex phase difference may be represented by an expression similar to the form:

$$\gamma_{opt} = \frac{H^{\dagger}H_2}{H^{\dagger}H_1}.$$

Accordingly, the second report may include one or more RIs based at least in part on the estimated first channel and the estimated second channel. Accordingly, the gNB 110*a* may use the RI(s) for reducing the interference 605 (e.g., as described in connection with FIG. 8A).

By using techniques described in connection with FIGS. 6 and 7B, the base station 110*a* may configure the RIS 405 to reflect an interfering signal from the non-serving cell towards the UE 120 such that the reflected interfering signal adds destructively with the interference 605 received by the UE 120. As a result, the UE 120 experiences decreased interference such that the UE 120 conserves power and processing resources when filtering and decoding signals from the base station 110*a*. Additionally, the UE 120 is more likely to receive and successfully decode the signals such that the base station 110*a* engages in fewer re-transmissions due to the decreased interference. As a result of the fewer re-transmissions, the base station 110*a* and the UE 120 conserve additional power and processing resources as well as reduce network overhead and congestion within the serving cell 102*a*.

As indicated above, FIG. 7B is provided as an example. Other examples may differ from what is described with respect to FIG. 7B.

Figure 8A:
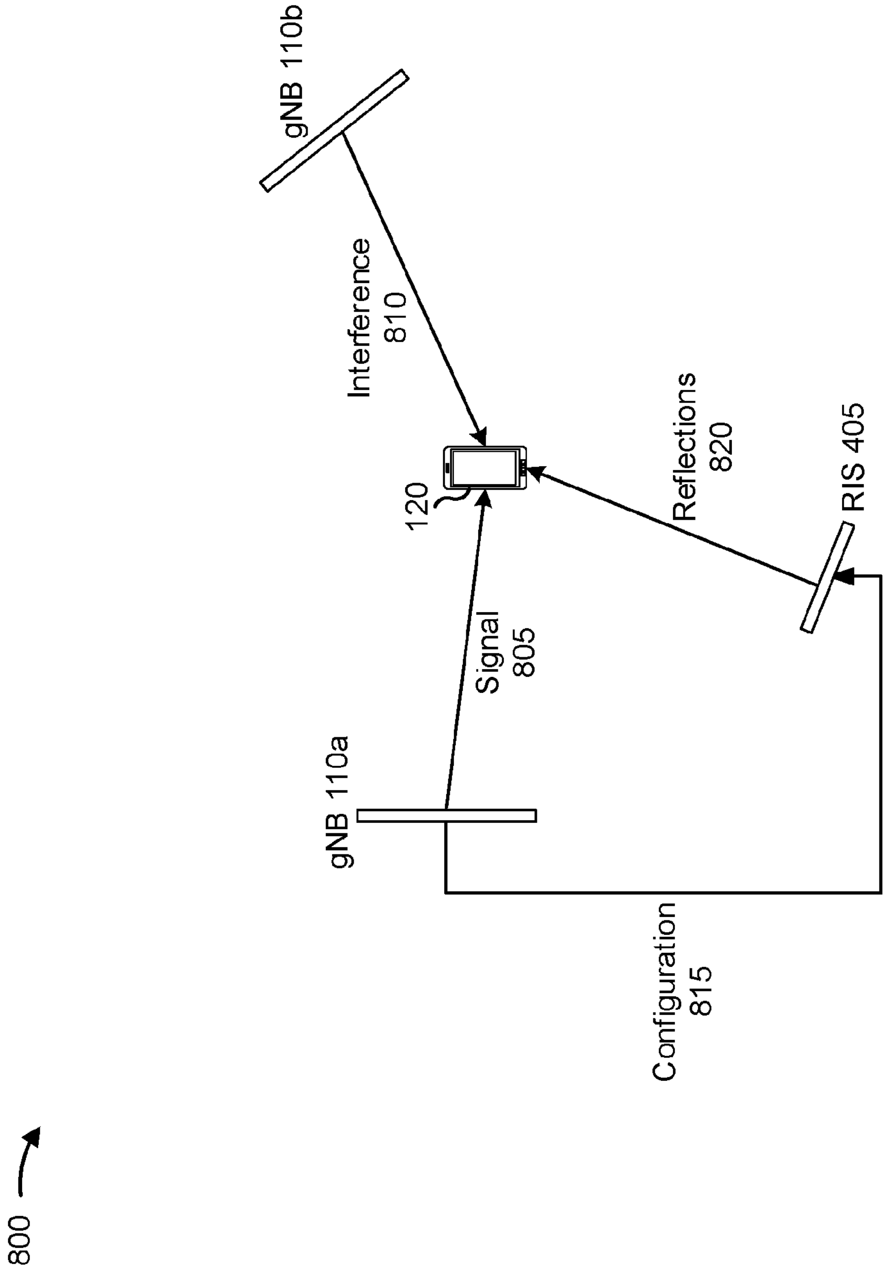
FIGS. 8A and 8B are diagrams illustrating examples associated with mitigating interference and serving a UE using an RIS, in accordance with the present disclosure.
Figure 8B:
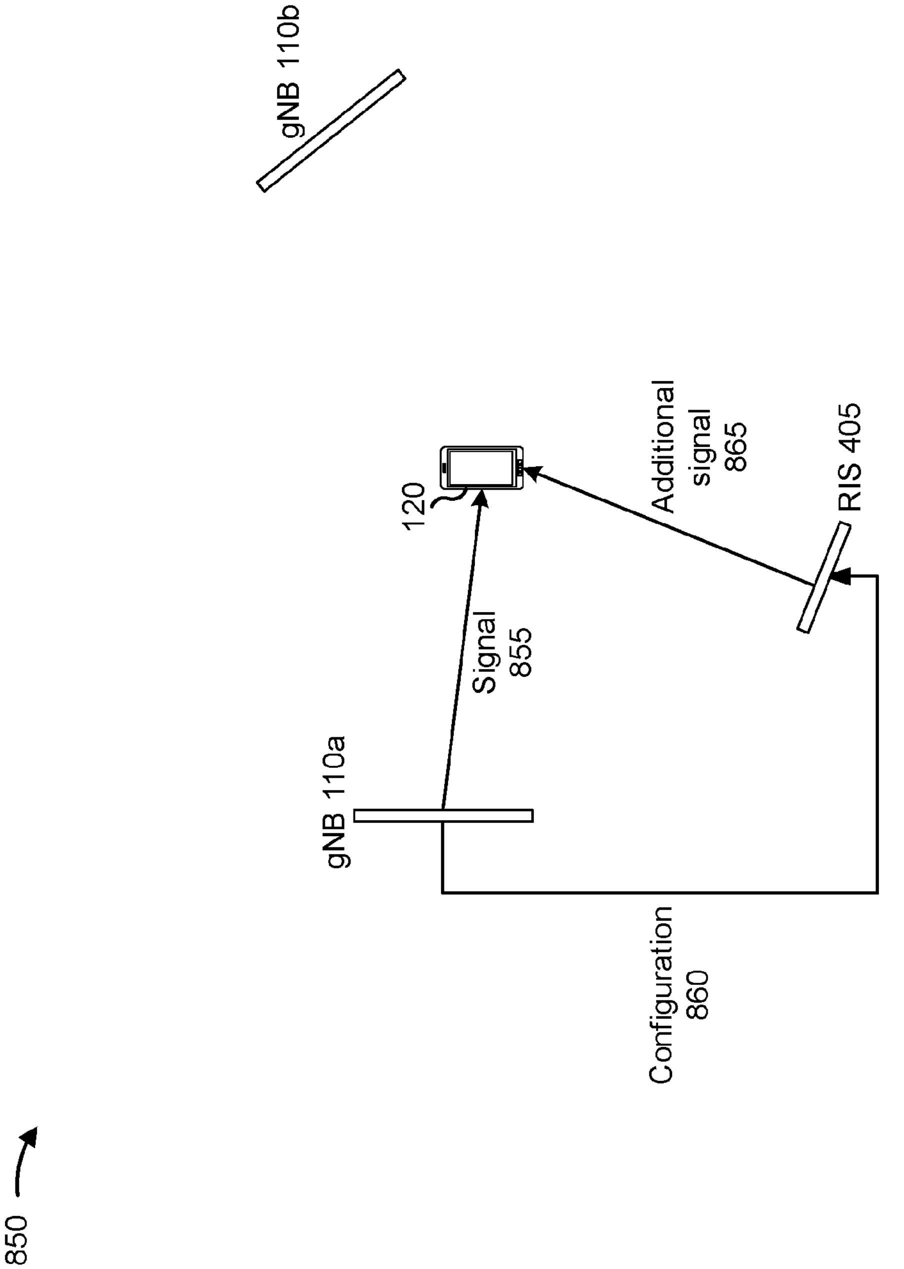

FIGS. 8A and 8B are diagrams illustrating an example 800 associated with mitigating interference using an RIS and an example 850 associated with serving a UE using an RIS, respectively, in accordance with the present disclosure. Similar to example 600, examples 800 and 850 each include a UE 120 within a serving cell that includes one or more gNBs, such as gNB 110*a*. The serving cell may be adjacent to, or at least within a distance threshold of, one or more non-serving cells that each include one or more gNBs, such as gNB 110*b*. Although described using one serving cell and one non-serving cell, the description similarly applies to additional serving cells (e.g., two serving cells, three serving cells, and so on, such as a plurality of serving cells communicating with the UE 120 in a MIMO mode) and/or additional non-serving cells (e.g., two non-serving cells, three non-serving cells, and so on). Additionally, or alternatively, although described using one gNB in the serving cell and one gNB in the non-serving cell, the description similarly applies to additional gNBs in the serving cell (e.g., two gNBs, three gNBs, and so on) and/or additional gNBs in the non-serving cell (e.g., two gNBs, three gNBs, and so on). In some aspects, the UE 120, the gNB 110*a*, and the gNB 110*b* may be included in a wireless network, such as wireless network 100.

The UE 120 may receive a signal 805 from the gNB 110*a* (e.g., the signal 805 may encode a message) as well as interference 810 from the gNB 110*b* of the non-serving cell. Accordingly, in example 800, the gNB 110*a* may use an RIS included in the serving cell (e.g., RIS 405) to mitigate the interference 810.

For example, the gNB 110*a* may transmit, and the RIS 405 may receive, a configuration 815. The configuration 815 may indicate one or more beams, one or more phases, and/or one or more other beamforming parameters, for the RIS 405 to use on a channel from the RIS 405 to the UE 120. The configuration 815 may be based at least in part on a first report and a second report (e.g., as described in connection with FIGS. 6 and 7A or in connection with FIGS. 6 and 7B). Accordingly, the interference 810 with the signal 805 is reduced based at least in part on reflections 820 of the interference 810 from the RIS 405, based at least in part on the configuration from the gNB 110*a*. For example, the interference 810 is at least partially combined, destructively, with the reflections 820.

In some circumstances, the interference 810 may fail to satisfy a threshold (or may not be present, as shown in FIG. 8B). Accordingly, in example 850, the gNB 110*a* may use the RIS 405 to increase throughput to the UE 120.

For example, the gNB 110*a* may transmit, and the RIS 405 may receive, an updated configuration 860. The updated configuration 860 may indicate one or more beams, one or more phases, and/or one or more other beamforming parameters, for the RIS 405 to use on a channel from the RIS 405 to the UE 120. Accordingly, the gNB 110*a* may transmit a signal 855 (e.g., the signal 855 may encode a message) to the UE 120 on a channel from the serving cell to the UE 120 and may transmit an additional signal 865 (e.g., the additional signal 865 may encode an additional message) to the UE 120 on a channel from the RIS 405 to the UE 120.

As an alternative, the gNB 110*a* may use the RIS 405 to increase reliability and/or quality of communications with the UE 120. For example, the gNB 110*a* may transmit, and the RIS 405 may receive, an updated configuration. The updated configuration may indicate one or more beams, one or more phases, and/or one or more other beamforming parameters, for the RIS 405 to use on a channel from the RIS 405 to the UE 120. Accordingly, the gNB 110*a* may transmit a signal (e.g., the signal may encode a message) to the UE 120 on a channel from the serving cell to the UE 120 and may transmit the same signal to the UE 120 on a channel from the RIS 405 to the UE 120 in order to increase the chances that the UE 120 receives and successfully decodes the signal.

By using techniques described in connection with FIGS. 8A and 8B, the base station 110*a* may configure the RIS 405 to switch between mitigating interference 810 using reflections 820 and transmitting additional signal 865 to the UE 120. As a result, the base station 110*a* may configure the RIS 405 to reduce interference for the UE 120 such that the UE 120 conserves power and processing resources when filtering and decoding signals from the base station 110*a*. As an alternative, the base station 110*a* may configure the RIS 405 to provide additional throughput from the base station 110*a* to the UE 120 in order to reduce latency, or may configure the RIS 405 to increase quality and/or reliability of communications from the base station 110*a* to the UE 120.

As indicated above, FIGS. 8A and 8B are provided as examples. Other examples may differ from what is described with respect to FIGS. 8A and 8B.

Figure 9:
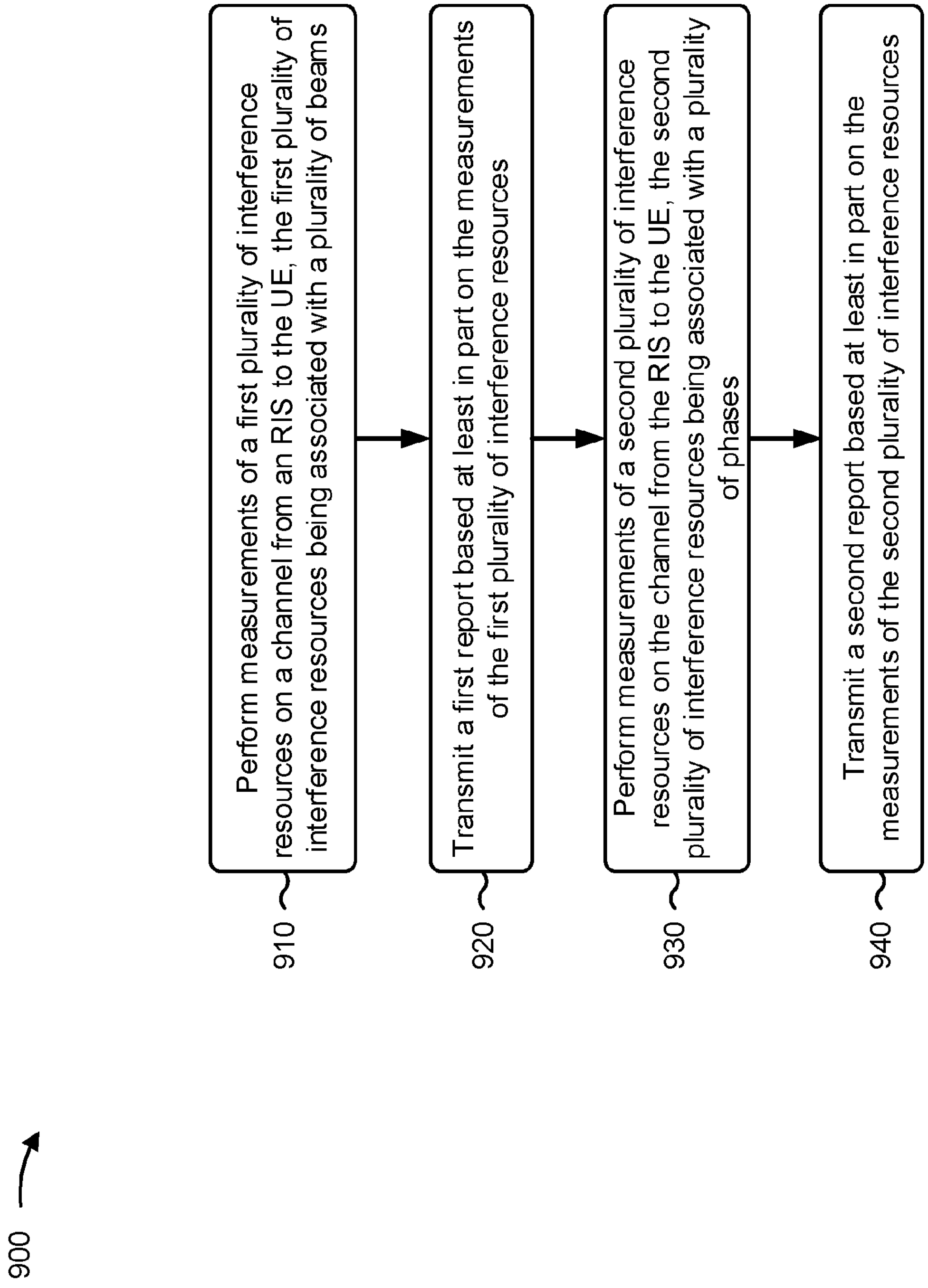
FIGS. 9 and 10 are diagrams illustrating example processes associated with interference mitigation using RISs, in accordance with the present disclosure.

FIG. 9 is a diagram illustrating an example process 900 performed, for example, by a UE, in accordance with the present disclosure. Example process 900 is an example where the UE (e.g., UE 120 and/or apparatus 1100 of FIG. 11) performs operations associated with interference mitigation using RISs.

As shown in FIG. 9, in some aspects, process 900 may include performing measurements of a first plurality of interference measurement resources on a channel from an RIS (e.g., RIS 405 and/or apparatus 1300 of FIG. 13) to the UE (block 910). For example, the UE (e.g., using communication manager 140 and/or measurement component 1108, depicted in FIG. 11) may perform measurements of a first plurality of interference measurement resources on a channel from an RIS to the UE, as described herein. In some aspects, the first plurality of interference measurement resources are associated with a plurality of beams.

As further shown in FIG. 9, in some aspects, process 900 may include transmitting, to a base station (e.g., the base station 110 and/or apparatus 1200 of FIG. 12), a first report based at least in part on the measurements of the first plurality of interference measurement resources (block 920). For example, the UE (e.g., using communication manager 140 and/or transmission component 1104, depicted in FIG.

11) may transmit, to a base station, a first report based at least in part on the measurements of the first plurality of interference measurement resources, as described herein.

As further shown in FIG. 9, in some aspects, process 900 may include performing measurements of a second plurality of interference measurement resources on the channel from the RIS to the UE (block 930). For example, the UE (e.g., using communication manager 140 and/or measurement component 1108) may perform measurements of a second plurality of interference measurement resources on the channel from the RIS to the UE, as described herein. In some aspects, the second plurality of interference measurement resources are associated with a plurality of phases.

As further shown in FIG. 9, in some aspects, process 900 may include transmitting, to the base station, a second report based at least in part on the measurements of the second plurality of interference measurement resources (block 940). For example, the UE (e.g., using communication manager 140 and/or transmission component 1104) may transmit, to the base station, a second report based at least in part on the measurements of the second plurality of interference measurement resources, as described herein.

Process 900 may include additional aspects, such as any single aspect or any combination of aspects described below and/or in connection with one or more other processes described elsewhere herein.

In a first aspect, the first plurality of interference measurement resources include at least one resource associated with a scatterer configuration of the RIS.

In a second aspect, alone or in combination with the first aspect, the first report indicates a resource, of the first plurality of interference measurement resources, associated with a highest measurement of the measurements of the first plurality of interference measurement resources.

In a third aspect, alone or in combination with one or more of the first and second aspects, the second plurality of interference measurement resources are associated with a beam, of the plurality of beams, that is associated with the resource indicated by the first report.

In a fourth aspect, alone or in combination with one or more of the first through third aspects, the first report indicates a difference between a highest measurement, of the measurements of the first plurality of interference measurement resources, and a lowest measurement, of the measurements of the first plurality of interference measurement resources.

In a fifth aspect, alone or in combination with one or more of the first through fourth aspects, the second report indicates a resource, of the second plurality of interference measurement resources, associated with a lowest measurement of the measurements of the second plurality of interference measurement resources.

Figure 11:
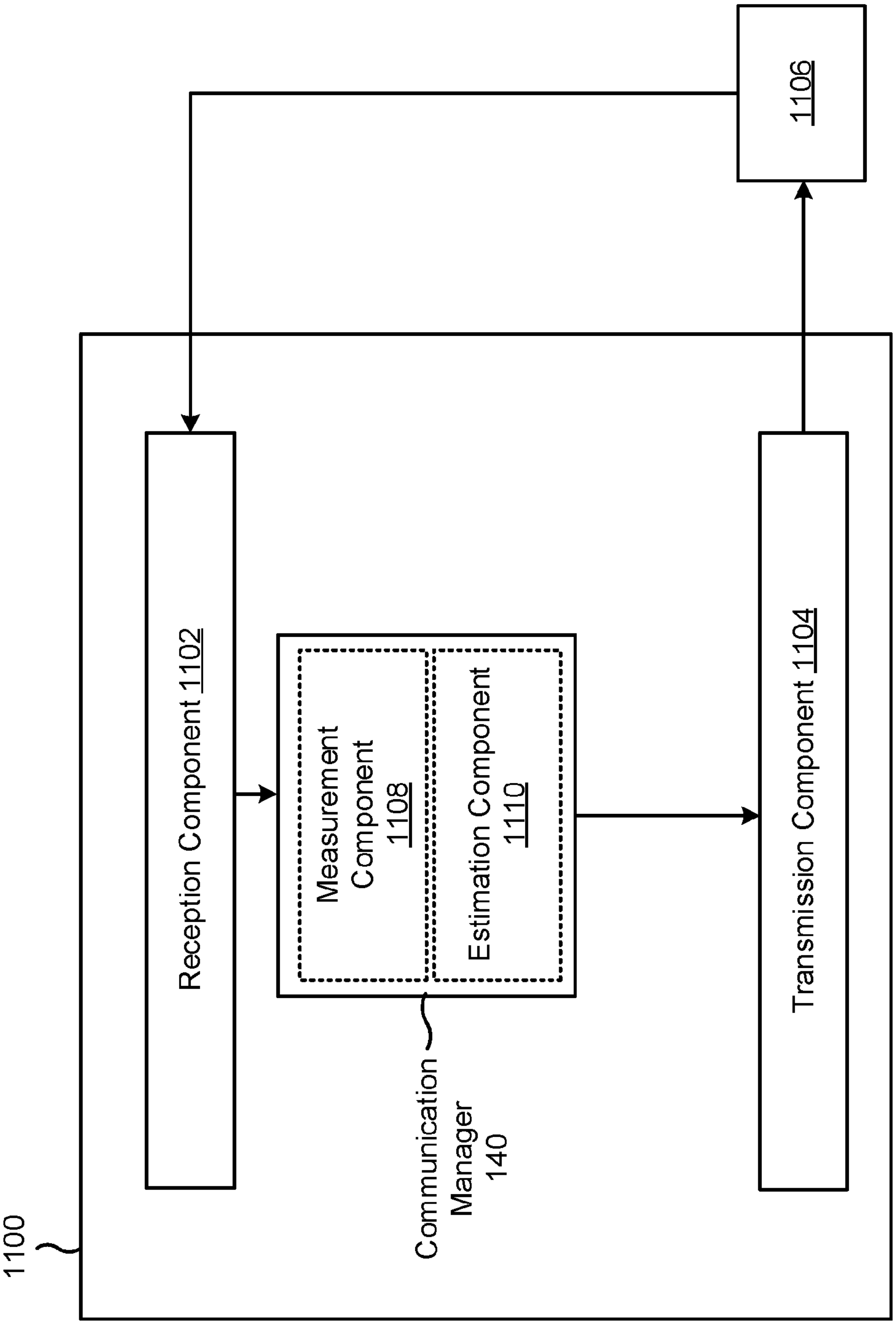
FIGS. 11, 12, and 13 are diagrams of example apparatuses for wireless communication, in accordance with the present disclosure.

In a sixth aspect, alone or in combination with one or more of the first through fifth aspects, process 900 further includes receiving (e.g., using communication manager 140 and/or reception component 1102, depicted in FIG. 11), from the base station, an indication of a reference signal configuration associated with a neighbor cell, and estimating (e.g., using communication manager 140 and/or estimation component 1110, depicted in FIG. 11) a first channel from the neighbor cell to the UE and a second channel from the RIS to the UE based at least in part on the second plurality of interference measurement resources, such that the second report is based at least in part on the estimated first channel and the estimated second channel.

In a seventh aspect, alone or in combination with one or more of the first through sixth aspects, the second plurality of interference measurement resources include at least one resource associated with a scatterer configuration of the RIS.

In an eighth aspect, alone or in combination with one or more of the first through seventh aspects, the second report includes one or more RIs based at least in part on the estimated first channel and the estimated second channel.

In a ninth aspect, alone or in combination with one or more of the first through eighth aspects, process 900 further includes receiving (e.g., using communication manager 140 and/or reception component 1102), from the base station, a message on a channel from the base station to the UE, where interference on a channel from a neighbor cell to the UE is at least partially combined, destructively, with interference on a channel from the RIS to the UE, and the channel from the RIS to the UE is based at least in part on the first report and the second report.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
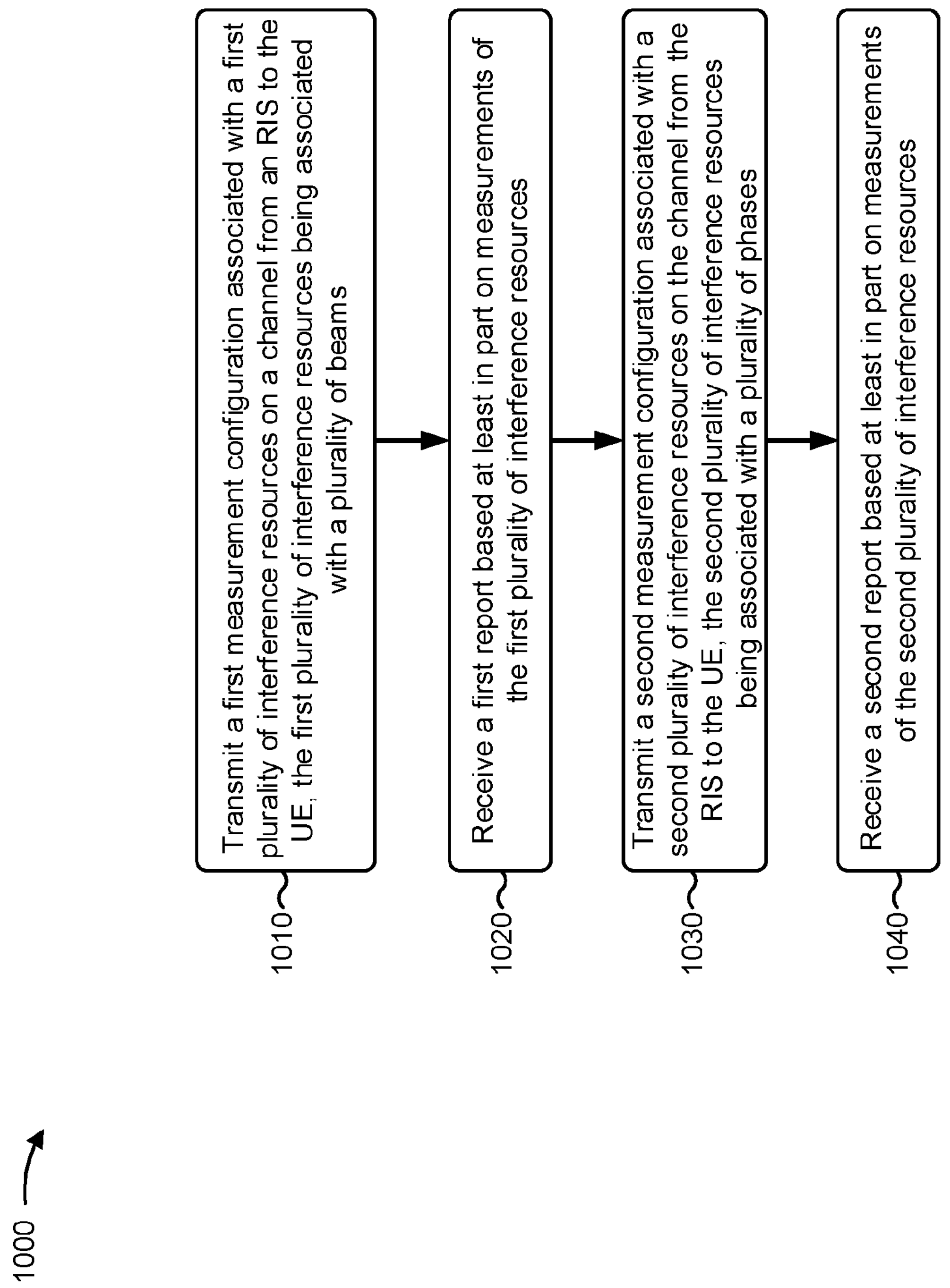

FIG. 10 is a diagram illustrating an example process 1000 performed, for example, by a base station, in accordance with the present disclosure. Example process 1000 is an example where the base station (e.g., base station 110 and/or apparatus 1200 of FIG. 12) performs operations associated with interference mitigation using RISs.

As shown in FIG. 10, in some aspects, process 1000 may include transmitting, to a UE (e.g., UE 120 and/or apparatus 1100 of FIG. 11), a first measurement configuration associated with a first plurality of interference measurement resources on a channel from an RIS (e.g., RIS 405 and/or apparatus 1300 of FIG. 13) to the UE (block 1010). For example, the base station (e.g., using communication manager 150 and/or transmission component 1204, depicted in FIG. 12) may transmit, to a UE, a first measurement configuration associated with a first plurality of interference measurement resources on a channel from an RIS to the UE, as described herein. In some aspects, the first plurality of interference measurement resources are associated with a plurality of beams.

As further shown in FIG. 10, in some aspects, process 1000 may include receiving, from the UE, a first report based at least in part on measurements of the first plurality of interference measurement resources (block 1020). For example, the base station (e.g., using communication manager 150 and/or reception component 1202, depicted in FIG. 12) may receive, from the UE, a first report based at least in part on measurements of the first plurality of interference measurement resources, as described herein.

As further shown in FIG. 10, in some aspects, process 1000 may include transmitting, to the UE, a second measurement configuration associated with a second plurality of interference measurement resources on the channel from the RIS to the UE (block 1030). For example, the base station (e.g., using communication manager 150 and/or transmission component 1204) may transmit, to the UE, a second measurement configuration associated with a second plurality of interference measurement resources on the channel from the RIS to the UE, as described herein. In some aspects, the second plurality of interference measurement resources are associated with a plurality of phases.

As further shown in FIG. 10, in some aspects, process 1000 may include receiving, from the UE, a second report based at least in part on measurements of the second plurality of interference measurement resources (block 1040). For example, the base station (e.g., using communication manager 150 and/or reception component 1202) may receive, from the UE, a second report based at least in part on measurements of the second plurality of interference measurement resources, as described herein.

Process 1000 may include additional aspects, such as any single aspect or any combination of aspects described below and/or in connection with one or more other processes described elsewhere herein.

In a first aspect, process 1000 further includes transmitting (e.g., using communication manager 150 and/or transmission component 1204), to the RIS, one or more instructions associated with the first measurement configuration, and transmitting (e.g., using communication manager 150 and/or transmission component 1204), to the RIS, one or more instructions associated with the second measurement configuration.

In a second aspect, alone or in combination with the first aspect, the first plurality of interference measurement resources include at least one resource associated with a scatterer configuration of the RIS.

In a third aspect, alone or in combination with one or more of the first and second aspects, the first report indicates a resource, of the first plurality of interference measurement resources, associated with a highest measurement of the measurements of the first plurality of interference measurement resources.

In a fourth aspect, alone or in combination with one or more of the first through third aspects, the second plurality of interference measurement resources are associated with a beam, of the plurality of beams, that is associated with the resource indicated by the first report.

In a fifth aspect, alone or in combination with one or more of the first through fourth aspects, the first report indicates a difference between a highest measurement, of the measurements of the first plurality of interference measurement resources, and a lowest measurement, of the measurements of the first plurality of interference measurement resources.

In a sixth aspect, alone or in combination with one or more of the first through fifth aspects, process 1000 further includes transmitting (e.g., using communication manager 150 and/or transmission component 1204), to the RIS, one or more instructions based at least in part on the difference indicated by the first report.

In a seventh aspect, alone or in combination with one or more of the first through sixth aspects, the second report indicates a resource, of the second plurality of interference measurement resources, associated with a lowest measurement of the measurements of the second plurality of interference measurement resources.

In an eighth aspect, alone or in combination with one or more of the first through seventh aspects, process 1000 further includes transmitting (e.g., using communication manager 150 and/or transmission component 1204), to the UE, an indication of a reference signal configuration associated with a neighbor cell, such that the second report is based at least in part on an estimated first channel from the neighbor cell to the UE and an estimated second channel from the RIS to the UE based at least in part on the second plurality of interference measurement resources.

In a ninth aspect, alone or in combination with one or more of the first through eighth aspects, the second plurality of interference measurement resources include at least one resource associated with a scatterer configuration of the RIS.

In a tenth aspect, alone or in combination with one or more of the first through ninth aspects, the second report includes one or more RIs based at least in part on the estimated first channel and the estimated second channel.

In an eleventh aspect, alone or in combination with one or more of the first through tenth aspects, process 1000 further includes transmitting (e.g., using communication manager 150 and/or transmission component 1204), to the RIS, a configuration based at least in part on the first report and the second report, and transmitting (e.g., using communication manager 150 and/or transmission component 1204), to the UE, a message on a channel from the base station to the UE, where interference with the message from a neighbor cell is reduced based at least in part on the configuration transmitted to the RIS.

In a twelfth aspect, alone or in combination with one or more of the first through eleventh aspects, process further 1000 includes transmitting (e.g., using communication manager 150 and/or transmission component 1204), to the RIS, an updated configuration associated with the base station, and transmitting (e.g., using communication manager 150 and/or transmission component 1204), to the UE, an additional message on the channel from the base station to the UE and on an additional channel from the RIS to the UE.

In a thirteenth aspect, alone or in combination with one or more of the first through twelfth aspects, process 1000 further includes transmitting (e.g., using communication manager 150 and/or transmission component 1204), to the RIS, an updated configuration associated with the base station, transmitting (e.g., using communication manager 150 and/or transmission component 1204), to the UE, a first additional message on the channel from the base station to the UE, and transmitting, to the UE, a second additional message on an additional channel from the RIS to the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a measurement component 1108 or an estimation component 1110, among other examples.

In some aspects, the apparatus 1100 may be configured to perform one or more operations described herein in connection with FIGS. 5, 6, 7A, 7B, 8A, and 8B. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

In some aspects, the measurement component 1108 may perform measurements of a first plurality of interference measurement resources on a channel from an RIS to the apparatus 1100. The first plurality of interference measurement resources may be associated with a plurality of beams. Accordingly, the transmission component 1104 may transmit (e.g., to the apparatus 1106) a first report based at least in part on the measurements of the first plurality of interference measurement resources. Additionally, the measurement component 1108 may perform measurements of a second plurality of interference measurement resources on the channel from the RIS to the apparatus 1100. The second plurality of interference measurement resources may be associated with a plurality of phases. Accordingly, the transmission component 1104 may transmit (e.g., to the apparatus 1106) a second report based at least in part on the measurements of the second plurality of interference measurement resources. The measurement component 1108 may include one or more antennas, a modem, a demodulator, a MIMO detector, a receive processor, a controller/processor, a memory, or a combination thereof, of the UE described in connection with FIG. 2.

In some aspects, the reception component 1102 may receive (e.g., from the apparatus 1106) an indication of a reference signal configuration associated with a neighbor cell. Accordingly, the estimation component 1110 may estimate a first channel from the neighbor cell to the apparatus 1100 and a second channel from the RIS to the apparatus 1100 based at least in part on the second plurality of interference measurement resources. Accordingly, the second report may be based at least in part on the estimated first channel and the estimated second channel. The estimation component 1110 may include a modem, a demodulator, a MIMO detector, a receive processor, a controller/processor, a memory, or a combination thereof, of the UE described in connection with FIG. 2.

Accordingly, the reception component 1102 may receive (e.g., from the apparatus 1106) a message on a channel from the apparatus 1106 to the apparatus 1100, with interference on a channel from a neighbor cell to the apparatus 1100 being at least partially combined, destructively, with interference on a channel from the RIS to the apparatus 1100.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
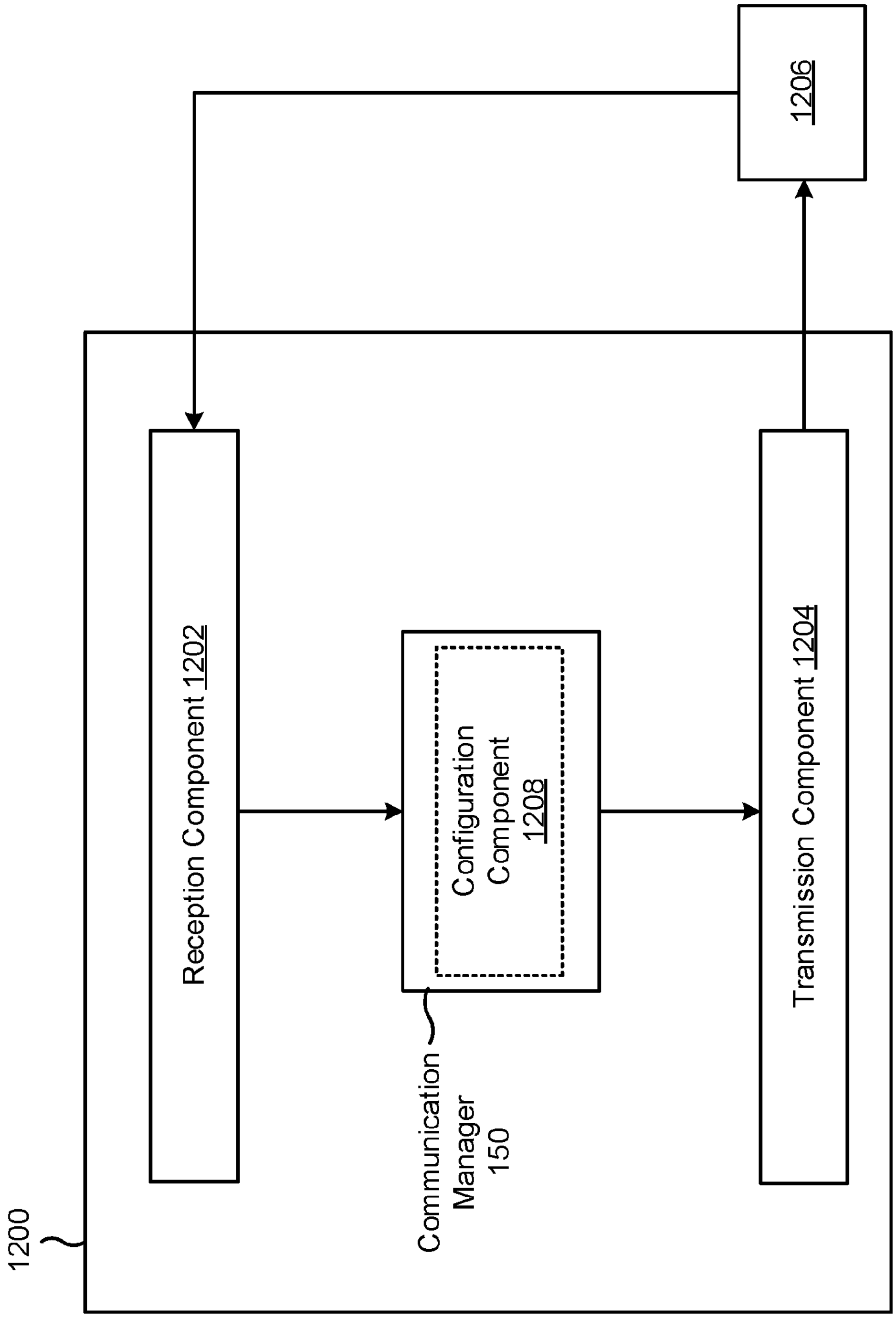

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a configuration component 1208, among other examples.

In some aspects, the apparatus 1200 may be configured to perform one or more operations described herein in connection with FIGS. 5-8B. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

In some aspects, the transmission component 1204 may transmit (e.g., to the apparatus 1206) a first measurement configuration associated with a first plurality of interference measurement resources on a channel from an RIS to the apparatus 1206. The first plurality of interference measurement resources may be associated with a plurality of beams. Accordingly, the reception component 1202 may receive (e.g., from the apparatus 1206) a first report based at least in part on measurements of the first plurality of interference measurement resources. Additionally, the transmission component 1204 may transmit (e.g., to the apparatus 1206) a second measurement configuration associated with a second plurality of interference measurement resources on the channel from the RIS to the apparatus 1206. The second plurality of interference measurement resources may be associated with a plurality of phases. Accordingly, the reception component 1202 may receive (e.g., from the apparatus 1206) a second report based at least in part on measurements of the second plurality of interference measurement resources.

In some aspects, the transmission component 1204 may transmit (e.g., to the RIS) one or more instructions associated with the first measurement configuration. Additionally, the transmission component 1204 may transmit (e.g., to the RIS) one or more instructions associated with the second measurement configuration. In some aspects, the transmission component 1204 may additionally transmit (e.g., to the RIS) one or more instructions based at least in part on a difference indicated by the first report.

In some aspects, the transmission component 1204 may transmit (e.g., to the apparatus 1206) an indication of a reference signal configuration associated with a neighbor cell such that the second report is based at least in part on an estimated first channel from the neighbor cell to the apparatus 1206 and an estimated second channel from the RIS to the apparatus 1206 based at least in part on the second plurality of interference measurement resources. For example, the reception component 1202 may receive an indication of the reference signal configuration from the neighbor cell.

In some aspects, the transmission component 1204 may transmit (e.g., to the RIS) a configuration based at least in part on the first report and the second report. For example, the configuration component 1208 may determine a configuration for the RIS based at least in part on the first report and the second report. The configuration component 1208 may include a modem, a demodulator, a modulator, a MIMO detector, a transmit MIMO processor, a receive processor, a transmit processor, a controller/processor, a memory, or a combination thereof, of the base station described in connection with FIG. 2. Accordingly, the transmission component 1204 may transmit (e.g., to the apparatus 1206) a message on a channel from the apparatus 1200 to the apparatus 1206 with interference with the message from a neighbor cell being reduced based at least in part on the configuration transmitted to the RIS.

In some aspects, the transmission component 1204 may further transmit (e.g., to the RIS) an updated configuration. For example, the configuration component 1208 may determine the updated configuration for the RIS. Accordingly, the transmission component 1204 may transmit (e.g., to the apparatus 1206) an additional message on the channel from the apparatus 1200 to the apparatus 1206 and on an additional channel from the RIS to the apparatus 1206. As an alternative, the transmission component 1204 may transmit (e.g., to the apparatus 1206) a first additional message on the channel from the apparatus 1200 to the apparatus 1206 and may transmit (e.g., to the apparatus 1206) a second additional message on an additional channel from the RIS to the apparatus 1206.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
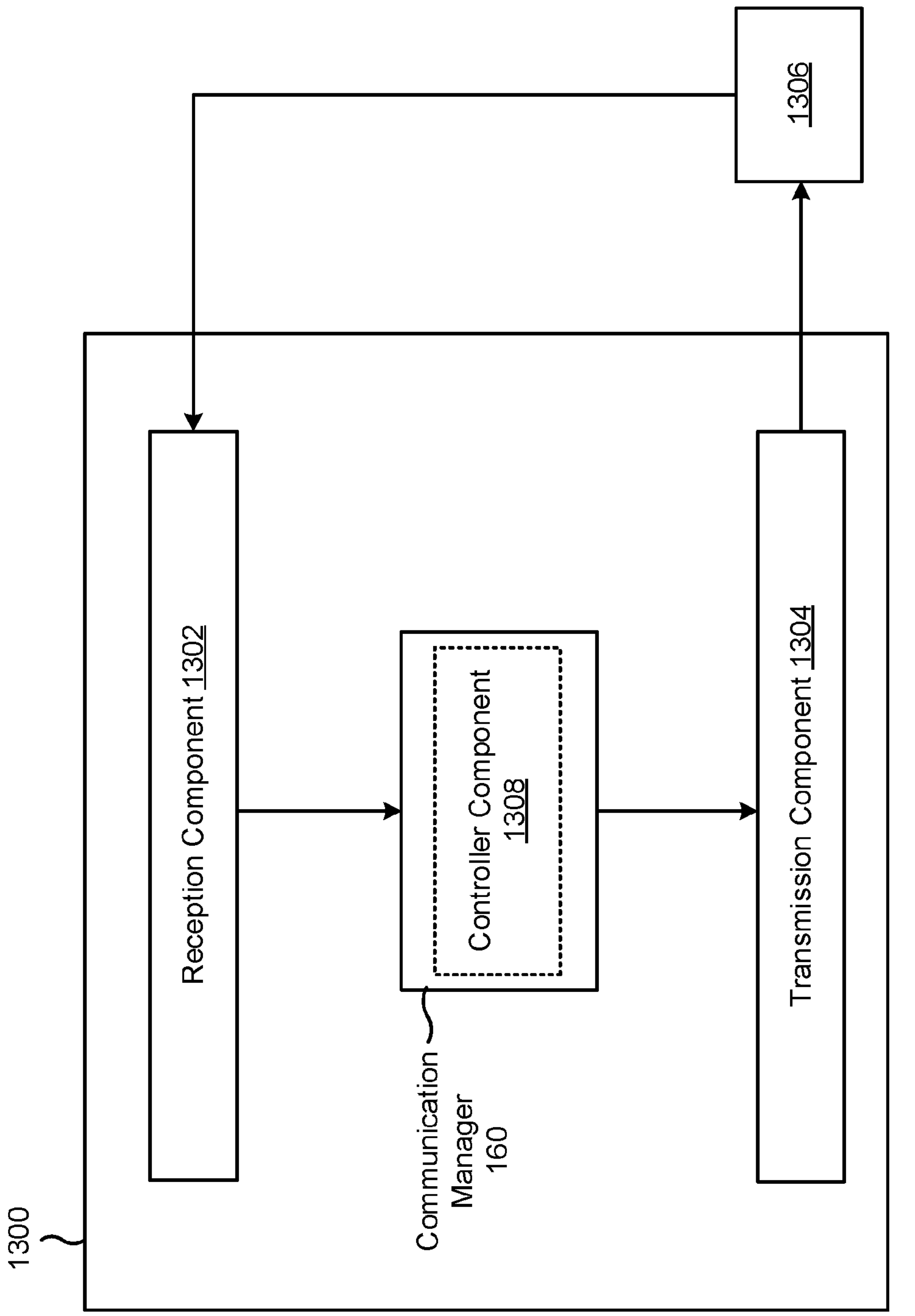

FIG. 13 is a diagram of an example apparatus 1300 for wireless communication. The apparatus 1300 may be an RIS, or an RIS may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 160. The communication manager 160 may include a controller component 1308, among other examples.

In some aspects, the apparatus 1300 may be configured to perform one or more operations described herein in connection with FIGS. 5-8B. Additionally, or alternatively, the apparatus 1300 may be configured to perform one or more processes described herein, or a combination thereof. In some aspects, the apparatus 1300 and/or one or more components shown in FIG. 13 may include one or more components of the UE and/or the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, as described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, as described in connection with FIG. 2. In some aspects, the transmission component 1304 may be co-located with the reception component 1302 in a transceiver.

In some aspects, the reception component 1302 and/or the transmission component 1304 may reflect an interfering signal from a non-serving cell towards the apparatus 1306 (e.g., a served UE) such that the reflected interfering signal adds destructively with the interfering signal received by the apparatus 1306 on a direct channel between the non-serving cell and the apparatus 1306. The controller component 1308 may adjust one or more electronic components of the apparatus 1300 to perform the reflection. For example, the controller component 1308 may adjust the electronic component(s) based at least in part on one or more instructions from a base station (e.g., received by the reception component 1302). The controller component 1308 may include a MIMO detector, a receive processor, a transmit MIMO processor, a transmit processor, a controller/processor, a memory, or a combination thereof, as described in connection with FIG. 2.

In some aspects, the reception component 1302 may receive, from a base station in a serving cell, one or more instructions one or more instructions associated with a first plurality of interference measurement resources on a channel from the RIS to the apparatus 1306. The first plurality of interference measurement resources may be associated with a plurality of beams; accordingly, the controller component 1308 may perform beam sweeping across the plurality of beams based at least in part on the one or more instructions. Additionally, the reception component 1302 may receive, from the base station in the serving cell, one or more additional instructions associated with a second plurality of interference measurement resources on the channel from the RIS to the apparatus 1306. The second plurality of interference measurement resources may be associated with a plurality of phases; accordingly, the controller component 1308 may perform phase sweeping across the plurality of phases based at least in part on the one or more additional instructions.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: performing measurements of a first plurality of interference measurement resources on a channel from a reconfigurable intelligent surface (RIS) to the UE, wherein the first plurality of interference measurement resources are associated with a plurality of beams; transmitting, to a base station, a first report based at least in part on the measurements of the first plurality of interference measurement resources; performing measurements of a second plurality of interference measurement resources on the channel from the RIS to the UE, wherein the second plurality of interference measurement resources are associated with a plurality of phases; and transmitting, to the base station, a second report based at least in part on the measurements of the second plurality of interference measurement resources.

Aspect 2: The method of Aspect 1, wherein the first plurality of interference measurement resources include at least one resource associated with a scatterer configuration of the RIS.

Aspect 3: The method of any of Aspects 1 through 2, wherein the first report indicates a resource, of the first plurality of interference measurement resources, associated with a highest measurement of the measurements of the first plurality of interference measurement resources.

Aspect 4: The method of Aspect 3, wherein the second plurality of interference measurement resources are associated with a beam, of the plurality of beams, that is associated with the resource indicated by the first report.

Aspect 5: The method of any of Aspects 1 through 4, wherein the first report indicates a difference between a highest measurement, of the measurements of the first plurality of interference measurement resources, and a lowest measurement, of the measurements of the first plurality of interference measurement resources.

Aspect 6: The method of any of Aspects 1 through 5, wherein the second report indicates a resource, of the second plurality of interference measurement resources, associated with a lowest measurement of the measurements of the second plurality of interference measurement resources.

Aspect 7: The method of any of Aspects 1 through 6, further comprising: receiving, from the base station, an indication of a reference signal configuration associated with a neighbor cell; and estimating a first channel from the neighbor cell to the UE and a second channel from the RIS to the UE based at least in part on the second plurality of interference measurement resources, wherein the second report is based at least in part on the estimated first channel and the estimated second channel.

Aspect 8: The method of Aspect 7, wherein the second plurality of interference measurement resources include at least one resource associated with a scatterer configuration of the RIS.

Aspect 9: The method of any of Aspects 7 through 8, wherein the second report includes one or more rank indicators (RIs) based at least in part on the estimated first channel and the estimated second channel.

Aspect 10: The method of any of Aspects 1 through 9, further comprising: receiving, from the base station, a message on a channel from the base station to the UE, wherein interference on a channel from a neighbor cell to the UE is at least partially combined, destructively, with interference on a channel from the RIS to the UE, wherein the channel from the RIS to the UE is based at least in part on the first report and the second report.

Aspect 11: A method of wireless communication performed by a base station, comprising: transmitting, to a user equipment (UE), a first measurement configuration associated with a first plurality of interference measurement resources on a channel from a reconfigurable intelligent surface (RIS) to the UE, wherein the first plurality of interference measurement resources are associated with a plurality of beams; receiving, from the UE, a first report based at least in part on measurements of the first plurality of interference measurement resources; transmitting, to the UE, a second measurement configuration associated with a second plurality of interference measurement resources on the channel from the RIS to the UE, wherein the second plurality of interference measurement resources are associated with a plurality of phases; and receiving, from the UE, a second report based at least in part on measurements of the second plurality of interference measurement resources.

Aspect 12: The method of Aspect 11, further comprising: transmitting, to the RIS, one or more instructions associated with the first measurement configuration; and transmitting, to the RIS, one or more instructions associated with the second measurement configuration.

Aspect 13: The method of any of Aspects 11 through 12, wherein the first plurality of interference measurement resources include at least one resource associated with a scatterer configuration of the RIS.

Aspect 14: The method of any of Aspects 11 through 13, wherein the first report indicates a resource, of the first plurality of interference measurement resources, associated with a highest measurement of the measurements of the first plurality of interference measurement resources.

Aspect 15: The method of Aspect 14, wherein the second plurality of interference measurement resources are associated with a beam, of the plurality of beams, that is associated with the resource indicated by the first report.

Aspect 16: The method of any of Aspects 11 through 15, wherein the first report indicates a difference between a highest measurement, of the measurements of the first plurality of interference measurement resources, and a lowest measurement, of the measurements of the first plurality of interference measurement resources.

Aspect 17: The method of Aspect 16, further comprising: transmitting, to the RIS, one or more instructions based at least in part on the difference indicated by the first report.

Aspect 18: The method of any of Aspects 11 through 16, wherein the second report indicates a resource, of the second plurality of interference measurement resources, associated with a lowest measurement of the measurements of the second plurality of interference measurement resources.

Aspect 19: The method of any of Aspects 11 through 18, further comprising: transmitting, to the UE, an indication of a reference signal configuration associated with a neighbor cell, wherein the second report is based at least in part on an estimated first channel from the neighbor cell to the UE and an estimated second channel from the RIS to the UE based at least in part on the second plurality of interference measurement resources.

Aspect 20: The method of Aspect 19, wherein the second plurality of interference measurement resources include at least one resource associated with a scatterer configuration of the RIS.

Aspect 21: The method of any of Aspects 19 through 20, wherein the second report includes one or more rank indicators (RIs) based at least in part on the estimated first channel and the estimated second channel.

Aspect 22: The method of any of Aspects 11 through 21, further comprising: transmitting, to the RIS, a configuration based at least in part on the first report and the second report; and transmitting, to the UE, a message on a channel from the base station to the UE, wherein interference with the message from a neighbor cell is reduced based at least in part on the configuration transmitted to the RIS.

Aspect 23: The method of Aspect 22, further comprising: transmitting, to the RIS, an updated configuration associated with the base station; and transmitting, to the UE, an additional message on the channel from the base station to the UE and on an additional channel from the RIS to the UE.

Aspect 24: The method of Aspect 22, further comprising: transmitting, to the RIS, an updated configuration associated with the base station; transmitting, to the UE, a first additional message on the channel from the base station to the UE; and transmitting, to the UE, a second additional message on an additional channel from the RIS to the UE.

Aspect 25: A method of wireless communication performed by a reconfigurable intelligent surface (RIS), comprising: reflecting an interfering signal from a non-serving cell towards a served UE such that the reflected interfering signal adds destructively with the interfering signal received by the served UE on a direct channel between the non-serving cell and the served UE.

Aspect 26: The method of Aspect 25, further comprising: receiving, from a base station in a serving cell, one or more instructions associated with a first plurality of interference measurement resources on a channel from the RIS to the UE, wherein the first plurality of interference measurement resources are associated with a plurality of beams; and performing beam sweeping across the plurality of beams based at least in part on the one or more instructions.

Aspect 27: The method of Aspect 26, further comprising: receiving, from the base station in the serving cell, one or more additional instructions associated with a second plurality of interference measurement resources on the channel from the RIS to the UE, wherein the second plurality of interference measurement resources are associated with a plurality of phases; and performing phase sweeping across the plurality of phases based at least in part on the one or more additional instructions.

Aspect 28: An apparatus for wireless communication at a device, comprising a processor; memory coupled with the processor; and instructions stored in the memory and executable by the processor to cause the apparatus to perform the method of one or more of Aspects 1-10.

Aspect 29: A device for wireless communication, comprising a memory and one or more processors coupled to the memory, the one or more processors configured to perform the method of one or more of Aspects 1-10.

Aspect 30: An apparatus for wireless communication, comprising at least one means for performing the method of one or more of Aspects 1-10.

Aspect 31: A non-transitory computer-readable medium storing code for wireless communication, the code comprising instructions executable by a processor to perform the method of one or more of Aspects 1-10.

Aspect 32: A non-transitory computer-readable medium storing a set of instructions for wireless communication, the set of instructions comprising one or more instructions that, when executed by one or more processors of a device, cause the device to perform the method of one or more of Aspects 1-10.

Aspect 33: An apparatus for wireless communication at a device, comprising a processor; memory coupled with the processor; and instructions stored in the memory and executable by the processor to cause the apparatus to perform the method of one or more of Aspects 11-24.

Aspect 34: A device for wireless communication, comprising a memory and one or more processors coupled to the memory, the one or more processors configured to perform the method of one or more of Aspects 11-24.

Aspect 35: An apparatus for wireless communication, comprising at least one means for performing the method of one or more of Aspects 11-24.

Aspect 36: A non-transitory computer-readable medium storing code for wireless communication, the code comprising instructions executable by a processor to perform the method of one or more of Aspects 11-24.

Aspect 37: A non-transitory computer-readable medium storing a set of instructions for wireless communication, the set of instructions comprising one or more instructions that, when executed by one or more processors of a device, cause the device to perform the method of one or more of Aspects 11-24.

Aspect 38: An apparatus for wireless communication at a device, comprising a processor; memory coupled with the processor; and instructions stored in the memory and executable by the processor to cause the apparatus to perform the method of one or more of Aspects 25-27.

Aspect 39: A device for wireless communication, comprising a memory and one or more processors coupled to the memory, the one or more processors configured to perform the method of one or more of Aspects 25-27.

Aspect 40: An apparatus for wireless communication, comprising at least one means for performing the method of one or more of Aspects 25-27.

Aspect 41: A non-transitory computer-readable medium storing code for wireless communication, the code comprising instructions executable by a processor to perform the method of one or more of Aspects 25-27.

Aspect 42: A non-transitory computer-readable medium storing a set of instructions for wireless communication, the set of instructions comprising one or more instructions that, when executed by one or more processors of a device, cause the device to perform the method of one or more of Aspects 25-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

perform measurements of a first plurality of interference measurement resources on a channel from a reconfigurable intelligent surface (RIS) to the UE, wherein the first plurality of interference measurement resources are associated with a plurality of beams;

transmit, to a network entity, a first report based at least in part on the measurements of the first plurality of interference measurement resources, wherein the first report indicates a candidate beam of the plurality of beams;

perform measurements of a second plurality of interference measurement resources on the channel from the RIS to the UE using the candidate beam, wherein the second plurality of interference measurement resources are associated with a plurality of phases associated with the candidate beam; and transmit, to the network entity, a second report based at least in part on the measurements of the second plurality of interference measurement resources.

2. The apparatus of claim 1, wherein the first plurality of interference measurement resources include at least one resource associated with a scatterer configuration of the RIS.

3. The apparatus of claim 1, wherein the first report indicates a resource, of the first plurality of interference measurement resources, associated with a highest measurement of the measurements of the first plurality of interference measurement resources.

4. The apparatus of claim 3, wherein the second plurality of interference measurement resources are associated with the candidate beam, that is associated with the resource indicated by the first report.

5. The apparatus of claim 1, wherein the first report indicates a difference between a highest measurement, of the measurements of the first plurality of interference measurement resources, and a lowest measurement, of the measurements of the first plurality of interference measurement resources.

6. The apparatus of claim 1, wherein the second report indicates a resource, of the second plurality of interference measurement resources, associated with a lowest measurement of the measurements of the second plurality of interference measurement resources.

7. The apparatus of claim 1, wherein the one or more processors are further configured to:

receive, from the network entity, an indication of a reference signal configuration associated with a neighbor cell; and estimate a first channel from the neighbor cell to the UE and a second channel from the RIS to the UE based at least in part on the second plurality of interference measurement resources, wherein the second report is based at least in part on the estimated first channel and the estimated second channel.

8. The apparatus of claim 7, wherein the second plurality of interference measurement resources include at least one resource associated with a scatterer configuration of the RIS.

9. The apparatus of claim 7, wherein the second report includes one or more rank indicators (RIs) based at least in part on the estimated first channel and the estimated second channel.

10. The apparatus of claim 1, wherein the one or more processors are further configured to:

receive, from the network entity, a message on a channel from the network entity to the UE, wherein interference on a channel from a neighbor cell to the UE, wherein the interference is at least partially combined, destructively, with interference on a channel from the RIS to the UE, wherein the channel from the RIS to the UE is based at least in part on the first report and the second report.

11. An apparatus for wireless communication at a network entity, comprising:

one or more memories; and one or more processors, coupled to the one or more memories, configured to:

transmit, to a user equipment (UE), a first measurement configuration associated with a first plurality of interference measurement resources on a channel from a reconfigurable intelligent surface (RIS) to the UE, wherein the first plurality of interference measurement resources are associated with a plurality of beams;

receive, from the UE, a first report based at least in part on measurements of the first plurality of interference measurement resources, wherein the first report indicates a candidate beam of the plurality of beams;

transmit, to the UE, a second measurement configuration associated with a second plurality of interference measurement resources on the channel from the RIS to the UE using the candidate beam, wherein the second plurality of interference measurement resources are associated with a plurality of phases associated with the candidate beam; and receive, from the UE, a second report based at least in part on measurements of the second plurality of interference measurement resources.

12. The apparatus of claim 11, wherein the one or more processors are further configured to:

transmit, to the RIS, one or more instructions associated with the first measurement configuration; and transmit, to the RIS, one or more instructions associated with the second measurement configuration.

13. The apparatus of claim 11, wherein the first plurality of interference measurement resources include at least one resource associated with a scatterer configuration of the RIS.

14. The apparatus of claim 11, wherein the first report indicates a resource, of the first plurality of interference measurement resources, associated with a highest measurement of the measurements of the first plurality of interference measurement resources.

15. The apparatus of claim 14, wherein the second plurality of interference measurement resources are associated with the candidate beam, that is associated with the resource indicated by the first report.

16. The apparatus of claim 11, wherein the first report indicates a difference between a highest measurement, of the measurements of the first plurality of interference measurement resources, and a lowest measurement, of the measurements of the first plurality of interference measurement resources.

17. The apparatus of claim 16, wherein the one or more processors are further configured to:

transmit, to the RIS, one or more instructions based at least in part on the difference indicated by the first report.

18. The apparatus of claim 11, wherein the second report indicates a resource, of the second plurality of interference measurement resources, associated with a lowest measurement of the measurements of the second plurality of interference measurement resources.

19. The apparatus of claim 11, wherein the one or more processors are further configured to:

transmit, to the UE, an indication of a reference signal configuration associated with a neighbor cell, wherein the second report is based at least in part on an estimated first channel from the neighbor cell to the UE and an estimated second channel from the RIS to the UE based at least in part on the second plurality of interference measurement resources.

20. The apparatus of claim 19, wherein the second plurality of interference measurement resources include at least one resource associated with a scatterer configuration of the RIS.

21. The apparatus of claim 19, wherein the second report includes one or more rank indicators (RIs) based at least in part on the estimated first channel and the estimated second channel.

22. The apparatus of claim 11, wherein the one or more processors are further configured to:

transmit, to the RIS, a configuration based at least in part on the first report and the second report; and transmit, to the UE, a message on a channel from the network entity to the UE, wherein interference with the message from a neighbor cell is reduced based at least in part on the configuration transmitted to the RIS.

23. The apparatus of claim 22, wherein the one or more processors are further configured to:

transmit, to the RIS, an updated configuration associated with the network entity; and transmit, to the UE, an additional message on the channel from the network entity to the UE and on an additional channel from the RIS to the UE.

24. The apparatus of claim 22, wherein the one or more processors are further configured to:

transmit, to the RIS, an updated configuration associated with the network entity;

transmit, to the UE, a first additional message on the channel from the network entity to the UE; and transmit, to the UE, a second additional message on an additional channel from the RIS to the UE.

25. A method of wireless communication performed by a user equipment (UE), comprising:

performing measurements of a first plurality of interference measurement resources on a channel from a reconfigurable intelligent surface (RIS) to the UE, wherein the first plurality of interference measurement resources are associated with a plurality of beams;

transmitting, to a network entity, a first report based at least in part on the measurements of the first plurality of interference measurement resources, wherein the first report indicates a candidate beam of the plurality of beams;

performing measurements of a second plurality of interference measurement resources on the channel from the RIS to the UE using the candidate beam, wherein the second plurality of interference measurement resources are associated with a plurality of phases associated with the candidate beam; and transmitting, to the network entity, a second report based at least in part on the measurements of the second plurality of interference measurement resources.

26. The method of claim 25, wherein the first report indicates a resource, of the first plurality of interference measurement resources, associated with a highest measurement of the measurements of the first plurality of interference measurement resources.

27. The method of claim 25, wherein the first report indicates a difference between a highest measurement, of the measurements of the first plurality of interference measurement resources, and a lowest measurement, of the measurements of the first plurality of interference measurement resources.

28. The method of claim 25, wherein the second report indicates a resource, of the second plurality of interference measurement resources, associated with a lowest measurement of the measurements of the second plurality of interference measurement resources.

29. The method of claim 25, further comprising:

receiving, from the network entity, an indication of a reference signal configuration associated with a neighbor cell; and estimating a first channel from the neighbor cell to the UE and a second channel from the RIS to the UE based at least in part on the second plurality of interference measurement resources, wherein the second report is based at least in part on the estimated first channel and the estimated second channel.

30. The method of claim 25, further comprising:

receiving, from the network entity, a message on a channel from the network entity to the UE, wherein interference on a channel from a neighbor cell to the UE, wherein the interference is at least partially combined, destructively, with interference on a channel from the RIS to the UE, wherein the channel from the RIS to the UE is based at least in part on the first report and the second report.

* * * * *